(12) United States Patent
Preston et al.

(10) Patent No.: US 7,747,281 B2
(45) Date of Patent: *Jun. 29, 2010

(54) METHOD FOR IN-BAND SIGNALING OF DATA OVER DIGITAL WIRELESS TELECOMMUNICATIONS NETWORKS

(75) Inventors: Dan A. Preston, Bainbridge Island, WA (US); Joseph Preston, Bainbridge Island, WA (US); Robert Leyendecker, Aloha, OR (US); Wayne Eatherly, Puyallup, WA (US); Rod L. Proctor, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/970,433

(22) Filed: Jan. 7, 2008

(65) Prior Publication Data

US 2008/0108389 A1 May 8, 2008

Related U.S. Application Data

(60) Continuation of application No. 10/099,098, filed on Mar. 15, 2002, now Pat. No. 7,317,696, which is a division of application No. 09/531,367, filed on Mar. 21, 2000, now Pat. No. 6,690,681, which is a continuation-in-part of application No. 09/230,079, filed as application No. PCT/US98/10317 on May 19, 1998, now Pat. No. 6,144,336.

(60) Provisional application No. 60/047,034, filed on May 19, 1997, provisional application No. 60/047,140, filed on May 20, 1997, provisional application No. 60/048,369, filed on Jun. 3, 1997, provisional application No. 60/048,385, filed on Jun. 3, 1997, provisional application No. 60/055,497, filed on Aug. 12, 1997.

(51) Int. Cl.
 *H04B 1/38* (2006.01)

(52) U.S. Cl. ............... 455/557; 455/556.1; 370/328; 370/493; 370/503; 370/519; 370/522

(58) Field of Classification Search ........... 370/352, 370/494, 512, 519, 328, 349, 493, 410, 522, 370/527, 529, 310, 503; 455/404.2, 556.1, 455/550.1, 557; 704/202, 208, 258, 262, 704/500

See application file for complete search history.

(56) References Cited

U.S. PATENT DOCUMENTS 3,742,197 A 6/1973 Pommerening (Continued)

FOREIGN PATENT DOCUMENTS

CA 2242495 1/2000

(Continued)

OTHER PUBLICATIONS

Office action for U.S. Appl. No. 09/625,159, mailed Apr. 9, 2003, 15 pages.

(Continued)

*Primary Examiner*—Dwayne Bost
*Assistant Examiner*—Inder P Mehra
(74) *Attorney, Agent, or Firm*—Stolowitz Ford Cowger LLP

(57) ABSTRACT

An inband signaling modem communicates digital data over a voice channel of a wireless telecommunications network. An input receives digital data. An encoder converts the digital data into audio tones that synthesize frequency characteristics of human speech. The digital data is also encoded to prevent voice encoding circuitry in the telecommunications network from corrupting the synthesized audio tones representing the digital data. An output then outputs the synthesized audio tones to a voice channel of a digital wireless telecommunications network.

3 Claims, 14 Drawing Sheets

U.S. PATENT DOCUMENTS

| | | |
|---|---|---|
| 3,971,888 A | 7/1976 | Ching |
| 3,984,814 A * | 10/1976 | Bailey et al. .................. 714/16 |
| 4,158,748 A | 6/1979 | En |
| 4,218,654 A | 8/1980 | Ogawa et al. |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A * | 3/1986 | Oura .......................... 704/258 |
| 4,598,272 A | 7/1986 | Cox |
| 4,599,583 A | 7/1986 | Shimozono et al. |
| 4,607,257 A | 8/1986 | Noguchi |
| 4,641,323 A | 2/1987 | Tsang |
| 4,651,157 A | 3/1987 | Gray |
| 4,656,463 A | 4/1987 | Anders et al. |
| 4,675,656 A | 6/1987 | Narcisse |
| 4,750,197 A | 6/1988 | Denekamp et al. |
| 4,754,255 A | 6/1988 | Sanders |
| 4,766,589 A | 8/1988 | Fisher |
| 4,914,651 A | 4/1990 | Lusignan |
| 4,918,425 A | 4/1990 | Greenberg et al. |
| 4,918,717 A | 4/1990 | Bissonnette et al. |
| 4,926,444 A | 5/1990 | Hamilton et al. |
| 4,941,155 A | 7/1990 | Chuang |
| 4,984,238 A | 1/1991 | Watanabe |
| 5,014,344 A | 5/1991 | Goldberg |
| 5,025,455 A | 6/1991 | Nguyen |
| 5,040,214 A | 8/1991 | Grossberg |
| 5,043,736 A | 8/1991 | Darnell et al. |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton et al. |
| 5,155,689 A | 10/1992 | Worthan |
| 5,201,071 A | 4/1993 | Webb |
| 5,203,012 A | 4/1993 | Patsiokas |
| 5,212,831 A | 5/1993 | Chuang |
| 5,218,618 A | 6/1993 | Sagey |
| 5,223,844 A | 6/1993 | Mansell et al. |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,282,204 A | 1/1994 | Shpancer |
| 5,289,372 A | 2/1994 | Guthrie et al. |
| 5,301,353 A | 4/1994 | Borras et al. |
| 5,301,359 A | 4/1994 | Van Den Heuvel |
| 5,305,384 A | 4/1994 | Ashby et al. |
| 5,317,309 A | 5/1994 | Vercellotti et al. |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman et al. |
| 5,365,577 A * | 11/1994 | Davis et al. .............. 379/93.17 |
| 5,379,224 A | 1/1995 | Brown et al. |
| 5,381,129 A | 1/1995 | Boardman |
| 5,388,147 A | 2/1995 | Grimes |
| 5,389,934 A | 2/1995 | Kass |
| 5,390,216 A | 2/1995 | Bilitza et al. |
| 5,396,539 A | 3/1995 | Slekys et al. |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny et al. |
| 5,418,537 A | 5/1995 | Bird |
| 5,420,592 A | 5/1995 | Johnson |
| 5,422,816 A | 6/1995 | Sprague et al. |
| 5,428,636 A | 6/1995 | Meier |
| 5,438,337 A | 8/1995 | Aguado |
| 5,440,491 A | 8/1995 | Kawano et al. |
| 5,448,622 A | 9/1995 | Huttunen |
| 5,450,130 A * | 9/1995 | Foley ...................... 348/391.1 |
| 5,459,469 A | 10/1995 | Schuchman et al. |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg et al. |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. et al. |
| 5,510,797 A | 4/1996 | Abraham et al. |
| 5,513,111 A | 4/1996 | Wortham |
| 5,515,043 A * | 5/1996 | Berard et al. ............... 340/988 |
| 5,519,403 A | 5/1996 | Bickley et al. |
| 5,519,621 A | 5/1996 | Wortham |
| 5,528,232 A | 6/1996 | Verma et al. |
| 5,530,701 A | 6/1996 | Stillman |
| 5,537,458 A | 7/1996 | Suomi et al. |
| 5,539,810 A | 7/1996 | Kennedy et al. |
| 5,543,789 A | 8/1996 | Behr |
| 5,544,222 A | 8/1996 | Robinson |
| 5,544,225 A | 8/1996 | Kennedy et al. |
| 5,546,445 A | 8/1996 | Dennison et al. |
| 5,550,551 A | 8/1996 | Alesio |
| 5,551,066 A | 8/1996 | Stillman |
| 5,555,286 A | 9/1996 | Tendler |
| 5,557,254 A | 9/1996 | Johnson |
| 5,559,520 A | 9/1996 | Barzegar et al. |
| 5,565,858 A | 10/1996 | Guthrie |
| 5,566,173 A | 10/1996 | Steinbrecher |
| 5,572,204 A | 11/1996 | Timm et al. |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner et al. |
| RE35,498 E | 4/1997 | Barnard |
| 5,619,684 A | 4/1997 | Goodwin |
| 5,621,388 A | 4/1997 | Sherburne et al. |
| 5,625,668 A | 4/1997 | Loomis et al. |
| 5,627,517 A | 5/1997 | Theimer et al. |
| 5,630,206 A | 5/1997 | Urban et al. |
| 5,640,444 A | 6/1997 | O'Sullivan |
| 5,650,770 A | 7/1997 | Schlager et al. |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera et al. |
| 5,686,910 A | 11/1997 | Timm et al. |
| 5,687,215 A | 11/1997 | Timm et al. |
| 5,687,216 A | 11/1997 | Svensson |
| 5,691,980 A | 11/1997 | Welles, II et al. |
| 5,703,598 A | 12/1997 | Emmons |
| 5,711,013 A | 1/1998 | Collett et al. |
| 5,712,619 A | 1/1998 | Simkin |
| 5,712,899 A | 1/1998 | Pace |
| 5,724,243 A | 3/1998 | Westerlage et al. |
| 5,726,893 A | 3/1998 | Schuchman et al. |
| 5,726,984 A | 3/1998 | Kubler et al. |
| 5,731,757 A | 3/1998 | Layson |
| 5,732,326 A | 3/1998 | Maruyama et al. |
| 5,734,981 A | 3/1998 | Kennedy, III et al. |
| 5,742,233 A | 4/1998 | Hoffman et al. |
| 5,748,083 A | 5/1998 | Rietkerk |

| | | | | | |
|---|---|---|---|---|---|
| 5,748,084 A | 5/1998 | Isikoff | 6,009,338 A | 12/1999 | Iwata |
| 5,751,246 A | 5/1998 | Hertel | 6,011,973 A | 1/2000 | Valentine et al. |
| 5,752,186 A | 5/1998 | Malackowski et al. | 6,014,089 A | 1/2000 | Tracy et al. |
| 5,752,193 A | 5/1998 | Scholefield | 6,014,090 A | 1/2000 | Rosen |
| 5,752,195 A | 5/1998 | Tsuji | 6,014,376 A | 1/2000 | Abreu |
| 5,754,554 A | 5/1998 | Nakahara | 6,021,163 A | 2/2000 | Hoshi |
| D395,250 S | 6/1998 | Kabler et al. | 6,024,142 A | 2/2000 | Bates |
| 5,761,204 A | 6/1998 | Grob et al. | 6,031,489 A | 2/2000 | Wyrwas et al. |
| 5,761,292 A | 6/1998 | Wagner | 6,032,037 A | 2/2000 | Jeffers |
| 5,771,001 A | 6/1998 | Cobb | 6,038,310 A | 3/2000 | Hollywood et al. |
| 5,771,455 A | 6/1998 | Kennedy et al. | 6,038,595 A | 3/2000 | Ortony |
| 5,774,876 A | 6/1998 | Woolley et al. | 6,041,124 A | 3/2000 | Sugita |
| 5,781,156 A | 7/1998 | Krasner | 6,044,257 A | 3/2000 | Boling et al. |
| 5,784,422 A | 7/1998 | Heermann | 6,049,971 A | 4/2000 | Petit |
| 5,786,789 A | 7/1998 | Janky | 6,055,434 A | 4/2000 | Seraj |
| 5,794,124 A | 8/1998 | Ito | 6,057,756 A | 5/2000 | Engellenner |
| 5,796,808 A | 8/1998 | Scott et al. | 6,067,044 A | 5/2000 | Whelan et al. |
| 5,797,091 A | 8/1998 | Clise et al. | 6,067,457 A | 5/2000 | Erickson et al. |
| 5,804,810 A | 9/1998 | Woolley et al. | 6,069,570 A | 5/2000 | Herring |
| 5,805,576 A | 9/1998 | Worley, III | 6,070,089 A | 5/2000 | Brophy et al. |
| 5,812,087 A | 9/1998 | Krasner | 6,075,458 A | 6/2000 | Ladner et al. |
| 5,812,522 A | 9/1998 | Lee | 6,076,099 A | 6/2000 | Chen et al. |
| 5,815,114 A | 9/1998 | Speasl et al. | 6,091,969 A | 7/2000 | Brophy et al. |
| RE35,916 E | 10/1998 | Dennison et al. | 6,097,760 A | 8/2000 | Spicer |
| 5,825,283 A | 10/1998 | Camhi | 6,101,395 A | 8/2000 | Keshavachar et al. |
| 5,825,327 A | 10/1998 | Krasner | 6,122,271 A | 9/2000 | McDonald |
| 5,826,188 A | 10/1998 | Tayloe | 6,122,514 A | 9/2000 | Spaur |
| 5,831,574 A | 11/1998 | Krasner | 6,131,067 A | 10/2000 | Girerd et al. |
| 5,832,394 A | 11/1998 | Wortham | 6,140,956 A | 10/2000 | Hillman et al. |
| 5,835,907 A | 11/1998 | Newman | 6,144,336 A | 11/2000 | Preston et al. |
| 5,838,237 A | 11/1998 | Revell et al. | 6,151,493 A | 11/2000 | Sasakura et al. |
| 5,841,396 A | 11/1998 | Krasner | 6,154,658 A | 11/2000 | Caci |
| 5,841,842 A * | 11/1998 | Baum et al. ............... 379/93.32 | 6,166,688 A | 12/2000 | Cromer et al. |
| 5,842,141 A | 11/1998 | Vaihoja | 6,169,497 B1 | 1/2001 | Robert |
| 5,850,392 A | 12/1998 | Wang | 6,173,194 B1 | 1/2001 | Vanttila |
| 5,856,986 A | 1/1999 | Sobey | 6,175,307 B1 | 1/2001 | Peterson |
| 5,864,763 A | 1/1999 | Leung et al. | 6,181,253 B1 | 1/2001 | Eschenbach et al. |
| 5,870,675 A | 2/1999 | Tuutijarvi | 6,195,736 B1 | 2/2001 | Lisle |
| 5,874,914 A | 2/1999 | Krasner | 6,208,959 B1 | 3/2001 | Jonsson |
| 5,881,069 A | 3/1999 | Cannon | 6,212,207 B1 | 4/2001 | Nicholas |
| 5,881,373 A | 3/1999 | Elofsson | 6,226,529 B1 * | 5/2001 | Bruno et al. ................ 455/557 |
| 5,884,214 A | 3/1999 | Krasner | 6,236,652 B1 | 5/2001 | Preston |
| 5,886,634 A | 3/1999 | Muhme | 6,249,227 B1 | 6/2001 | Brady et al. |
| 5,890,108 A * | 3/1999 | Yeldener .................... 704/208 | 6,266,008 B1 | 7/2001 | Huston et al. |
| 5,892,441 A | 4/1999 | Woolley et al. | 6,269,392 B1 | 7/2001 | Cotichini et al. |
| 5,892,454 A | 4/1999 | Schipper et al. | 6,272,315 B1 | 8/2001 | Chang et al. |
| 5,901,179 A | 5/1999 | Urabe | 6,275,990 B1 | 8/2001 | Dapper et al. |
| 5,912,886 A | 6/1999 | Takahashi et al. | 6,282,430 B1 | 8/2001 | Young |
| 5,913,170 A | 6/1999 | Wortham | 6,288,645 B1 | 9/2001 | McCall et al. |
| 5,917,449 A | 6/1999 | Sanderford et al. | 6,295,461 B1 | 9/2001 | Palmer et al. |
| 5,918,180 A | 6/1999 | Dimino | 6,300,863 B1 | 10/2001 | Cotichini et al. |
| 5,930,340 A | 7/1999 | Bell | 6,300,875 B1 | 10/2001 | Schafer |
| 5,930,722 A | 7/1999 | Han et al. | 6,301,480 B1 | 10/2001 | Kennedy, III et al. |
| 5,933,468 A | 8/1999 | Kingdon | 6,304,186 B1 | 10/2001 | Rabanne et al. |
| 5,936,526 A | 8/1999 | Klein | 6,304,637 B1 | 10/2001 | Mirashrafi et al. |
| 5,937,355 A | 8/1999 | Joong et al. | 6,307,471 B1 | 10/2001 | Xydis |
| 5,940,598 A | 8/1999 | Strauss et al. | 6,308,060 B2 | 10/2001 | Wortham |
| 5,945,944 A | 8/1999 | Krasner | 6,320,535 B1 | 11/2001 | Hillman |
| 5,946,304 A | 8/1999 | Chapman et al. | 6,327,533 B1 | 12/2001 | Chou |
| 5,946,611 A | 8/1999 | Dennison et al. | 6,343,217 B1 | 1/2002 | Borland |
| 5,949,335 A | 9/1999 | Maynard | 6,345,251 B1 | 2/2002 | Jansson et al. |
| 5,953,694 A | 9/1999 | Pillekamp | 6,351,495 B1 | 2/2002 | Tarraf |
| 5,960,363 A | 9/1999 | Mizikovsky et al. | 6,359,923 B1 | 3/2002 | Agee |
| 5,961,608 A | 10/1999 | Onosaka | 6,362,736 B1 | 3/2002 | Gehlot |
| 5,963,130 A | 10/1999 | Schlager et al. | 6,373,842 B1 | 4/2002 | Coverdale |
| 5,963,134 A | 10/1999 | Bowers et al. | 6,405,033 B1 | 6/2002 | Kennedy, III et al. |
| 5,970,130 A | 10/1999 | Katko | 6,434,198 B1 | 8/2002 | Tarraf |
| 5,978,676 A | 11/1999 | Guridi et al. | 6,470,046 B1 | 10/2002 | Scott |
| 5,991,279 A | 11/1999 | Haugli | 6,477,633 B1 | 11/2002 | Grimmett |
| 5,999,124 A | 12/1999 | Sheynblat | 6,493,338 B1 | 12/2002 | Preston |
| 5,999,126 A | 12/1999 | Ito | 6,516,198 B1 | 2/2003 | Tendler |
| 6,002,363 A | 12/1999 | Krasner | 6,519,260 B1 | 2/2003 | Galyas |
| 6,009,325 A | 12/1999 | Retzer | 6,522,265 B1 | 2/2003 | Hillman |

| | | | |
|---|---|---|---|
| 6,526,026 B1 | 2/2003 | Menon | |
| 6,529,744 B1 | 3/2003 | Birkler | |
| 6,567,673 B1 | 5/2003 | Charbonnier | |
| 6,611,804 B1 | 8/2003 | Dorbecker et al. | |
| 6,614,349 B1 | 9/2003 | Proctor et al. | |
| 6,617,979 B2 | 9/2003 | Yoshioka | |
| 6,628,967 B1 | 9/2003 | Yue | |
| 6,665,333 B2 | 12/2003 | McCrady | |
| 6,681,121 B1 | 1/2004 | Preston et al. | |
| 6,683,855 B1 | 1/2004 | Bordogna | |
| 6,690,681 B1 | 2/2004 | Preston et al. | |
| 6,690,922 B1 | 2/2004 | Lindemann | |
| 6,697,987 B2 | 2/2004 | Lee | |
| 6,700,867 B2 | 3/2004 | Classon | |
| 6,747,571 B2 | 6/2004 | Fierro | |
| 6,754,265 B1 | 6/2004 | Lindemann | |
| 6,771,629 B1 | 8/2004 | Preston et al. | |
| 6,778,645 B1 | 8/2004 | Rao | |
| 6,836,515 B1 | 12/2004 | Kay | |
| 6,845,153 B2 | 1/2005 | Tiburtius | |
| 6,981,022 B2 | 12/2005 | Boundy | |
| 6,993,362 B1 | 1/2006 | Aberg | |
| 7,103,550 B2 | 9/2006 | Gallagher | |
| 7,151,768 B2 | 12/2006 | Preston et al. | |
| 7,164,662 B2 | 1/2007 | Preston et al. | |
| 7,206,305 B2 | 4/2007 | Preston et al. | |
| 7,206,574 B2 | 4/2007 | Bright | |
| 7,215,965 B2 | 5/2007 | Fournier et al. | |
| 7,221,669 B2 * | 5/2007 | Preston et al. | 370/342 |
| 7,269,188 B2 | 9/2007 | Smith | |
| 7,317,696 B2 | 1/2008 | Preston | |
| 7,398,100 B2 | 7/2008 | Harris | |
| 7,477,906 B2 | 1/2009 | Radic | |
| 7,483,418 B2 | 1/2009 | Maurer | |
| 7,511,611 B2 | 3/2009 | Sabino | |
| 7,512,098 B2 | 3/2009 | Jiang | |
| 2002/0093924 A1 | 7/2002 | Preston et al. | |
| 2002/0093990 A1 | 7/2002 | Preston et al. | |
| 2002/0111167 A1 | 8/2002 | Nguyen | |
| 2002/0122401 A1 | 9/2002 | Xiang | |
| 2003/0016639 A1 | 1/2003 | Kransmo | |
| 2003/0147401 A1 | 8/2003 | Kyronaho | |
| 2004/0034529 A1 | 2/2004 | Hooper, III | |
| 2004/0171370 A1 | 9/2004 | Natarajan | |
| 2005/0090225 A1 | 4/2005 | Muehleisen | |
| 2005/0147057 A1 | 7/2005 | LaDue | |
| 2005/0215228 A1 | 9/2005 | Fostick | |
| 2005/0226202 A1 | 10/2005 | Zhang | |
| 2006/0246910 A1 | 11/2006 | Petermann | |
| 2007/0087756 A1 | 4/2007 | Hoffberg | |
| 2008/0132200 A1 | 6/2008 | Shinoda | |
| 2008/0143497 A1 | 6/2008 | Wasson et al. | |

FOREIGN PATENT DOCUMENTS

| | | |
|---|---|---|
| DE | 44 24 412 A1 | 1/1996 |
| DE | 4424412 | 1/1996 |
| EP | 0 242 099 A2 | 10/1987 |
| EP | 242 099 | 10/1987 |
| EP | 0 528 090 A1 | 8/1991 |
| EP | 0 512 789 | 5/1992 |
| EP | 0 501 058 A2 | 9/1992 |
| EP | 0 545 783 | 11/1992 |
| EP | 512 789 A2 | 11/1992 |
| EP | 545783 A1 | 11/1992 |
| EP | 0 528 090 A1 | 2/1993 |
| EP | 0 545 783 A1 | 6/1993 |
| EP | 0 580 397 A2 | 1/1994 |
| EP | 0889610 A2 | 1/1999 |
| EP | 0 545 783 B1 | 2/1999 |
| EP | 0 896 442 A1 | 2/1999 |
| GB | 2290005 A | 5/1994 |
| JP | 03232349 | 10/1991 |
| JP | 5130008 | 5/1993 |
| JP | 5252099 | 9/1993 |
| JP | 6077887 | 3/1994 |
| JP | 11109062 | 4/1999 |
| WO | WO 89/12835 | 12/1989 |
| WO | WO89/12835 | 12/1989 |
| WO | 9107044 | 10/1990 |
| WO | WO95/21511 | 8/1995 |
| WO | WO 95/21511 | 8/1995 |
| WO | WO 96/07110 | 3/1996 |
| WO | WO 96/15636 | 5/1996 |
| WO | WO96/15636 | 5/1996 |
| WO | WO96/18275 | 6/1996 |
| WO | WO 96/18275 | 6/1996 |
| WO | WO9834164 | 8/1998 |
| WO | WO9834359 | 8/1998 |
| WO | WO 98/53573 | 11/1998 |
| WO | WO98/53573 | 11/1998 |
| WO | WO 98/59256 | 12/1998 |
| WO | WO98/59257 | 12/1998 |
| WO | WO 98/59257 | 12/1998 |
| WO | WO 99/36795 | 7/1999 |
| WO | WO99/36795 | 7/1999 |
| WO | WO99/49677 | 9/1999 |
| WO | WO 99/49677 | 9/1999 |
| WO | WO99/56143 | 11/1999 |
| WO | WO 99/56143 | 11/1999 |
| WO | WO 99/56144 | 11/1999 |
| WO | WO99/56144 | 11/1999 |
| WO | WO00/11893 | 3/2000 |
| WO | WO 00/11893 | 3/2000 |
| WO | 0178249 A1 | 10/2001 |
| WO | 0199295 A2 | 12/2001 |
| WO | PCT/US02/00330 | 7/2002 |
| WO | 03034234 A1 | 4/2003 |

OTHER PUBLICATIONS

International Search Report, PCT/US01/27238, Feb. 13, 2002, 3 pages.

Lisa A. Phiter, Surfing the Web Over Wireless, Jan. 1998, http://www.corecom.com/html/wireless.html, printed May 22, 2007.

Brian W. Martin, "WatchIt: A Fully Supervised Identification, Location and Tracking System," Proceedings of the IEEE, 29th Annual 1995 International Carnahan Conference on Security Technology, Oct. 1995.

Thomas W. Christ, "A Prison Guard Duress Alarm Location System," Proceedings of the IEEE 1993 International Carnahan Conference on Security Technology: Security Technology, Oct. 13-15, 1993, Copyright 1993 IEEE.

Anton B. Reut, "Remote Monitoring of Military Assets Using Commercial Leo Satellites," IEEE Universal Communications Conference Record, Nov. 6-8, 1995, Copyright 1995 IEEE.

Jay Werb and Colin Lanzl, "Designing a Positioning System for Finding Things and People Indoors," *IEEE Spectrum*, Sep. 1998.

Jay Werb and Colin Lanzl, "The Next Generation of Control: Local Positioning," abstract, Feb. 1999, vol. 26.

Coleman et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, *IEEE*, New York, New York.

Lin et al., "Data Compression of Voiceband Modem Signals," 40th IEEE Vehicular Technology Conference : On the Move in the 90s. May 6-9, 1990, pp. 323-325, *IEEE*, New York, New York.

PCT International Search Report dated Nov. 27, 2000, for International Application No. PCT/US00/13288.

Mueller et al., "A DSP Implemented Dual 9600/7200 BPS TCM Modem for Mobile Communications Over FM Voice Radios," Proceedings of the 1997 6th IEEE Pacific Rim C9onferencc on Communications, Computers and Signal Processing, vol. 2, Aug. 20-22, 1997, pp. 758-761, *IEEE*, New York, New York.

Brown et al., "A Reconfigurable Modem for Increased Network Capacity and Video, Voice, and Data Transmission over GSM PCS," IEEE Trans. on Circuits and Systems for Video Technology, vol. 6, No. 2, Apr. 1996, pp. 215-224.

Fehler, "MODEMS for Emerging Digital Cellular-Mobile Radio System," IEEE Trans. on Vehicular Technology, vol. 40, No. 2, May 1991, pp. 355-365.

International Search Report, PCT/US00/13288, Nov. 17, 2000.

International Search Report, PCT/US01/20221, Aug. 21, 2001.

Coleman et al., "Subjective Performance Evaluation of the RPE-LTP Codec for the Pan-European Cellular Digital Mobile Radio System," *IEEE*, 1989, pp. 758-761.

European Search Report dated Dec. 22, 2004 for EP01950402, 5 pages.

International Search Report, PCT/US01/20021, Jan. 3, 2002, 5 pages.

International Search Report, PCT/US01/19845, Nov. 22, 2001, 5 pages.

International Search Report, PCT/US00/13288, Nov. 27, 2000, 4 pages.

International Search Report, PCT/US00/01157, May 23, 2000, 5 pages.

Brown et al., "A Reconfigurable Modem of Increased Network Capacity and Video, Voice, and Data Transmission over GSM PCS," IEEE Trans. on Circuits and Systems for Video Technology, vol. 6, No. 2, Apr. 1996, pp. 215-224.

Fehler, "MODEMS for Emerging Digital Cellular-Mobile Radio System," IEEE Trans. on Vehicular Technology, vol. 40, No. 2, May 1991, pp. 355-365.

Lin et al., "Data Compression of Voioeband Modem Signals," *IEEE*, 1990, pp. 323-325.

Mueller et al, "A DSP Implemented Dual 9600/7200 bps TCM Modem for Mobile Communications Over FM Voice Radios," *IEEE*, 1997, pp. 758-761.

Jain et al, Potential Networking Applications of Global Positioning Systems (GPS), downloadable at http://www.cis.ohio-state.edu/~jain/papers/gps.htm, pp. 1-40, Apr. 1996.

R.E. Lavigne and P Eng, "Trunking Versus Conventional Radio System," Proceedings of the IEEE, 34th Annual 2000 International Carnahan Conference on Security Technology, Oct. 23-25, 2000.

Alfonso Bilbao, m-Security (Security and Mobile Telephony), Proceedings of the IEEE 35th Annual 2001, International Carnahan Conference on Security Technology, Oct. 16-19, 2001.

Shawn McNichols, "Keeping Your Assets Safe," published on the Internet at http://www.securitymagazine.com,CDA/ArticieInformation/features/BNP_Features, posted Feb. 14, 2002, Copyright 2001-2002 by Business News Publishing Co.

"Tracking," published on the Internet at http://www.wisetrack.com/tracking.html, posted May 29, 2002, Copyright 2001 by TVL, Inc.

Janus Technologies, Inc., "ProxTrak Asset Tracking Interface," copyright 2000 Janus Technologies, Inc., published on the Internet at http://www.janus-tech.com/Products/ProxTrax.html, printed May 29, 2002.

Lockwood Technology Corporation, "Asset Management," copyright 2002 by Lockwood Technology Corporation, published on the Internet at http://www.lockwoodtechnology.com/asset_tracking.html, printed May 29, 2002.

PCT International Search Report dated Jun. 24, 2002, for International Application No. PCT/US02/00996.

Office action for U.S. Appl. No. 09/677,486, mailed Oct. 16, 2001, 9 pages.

Stolowitz Ford Cowger, LLP, List of Related Cases, Jun. 23, 2009.

3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

U.S. Appl. No. 60/047,034 dated May 19, 1997; Applicant—Preston.
U.S. Appl. No. 60/047,140 dated May 20, 1997; Applicant—Preston.
U.S. Appl. No. 60/048,369 dated Jun. 3, 1997; Applicant—Preston.
U.S. Appl. No. 60/048,385 dated Jun. 3, 1997; Applicant—Preston.
U.S. Appl. No. 60/055,497 dated Aug. 12, 1997; Applicant—Preston.

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

Protean Research Group, "Anycast Routing for Mobile Services (ARMS) Project Overview," Published on the Internet at <http://tang.itd.nrl.navy.mll/5522/anycast/anycast_index.html>.

Vaha-Sipila, A., URLs for Telephone Calls, Request for Comments: 2806, Network Working Group, Apr. 2000, 16 pages.

Vocal Technologies, Ltd. Home Page, "Audio Codecs," http://www.vocal.com/data_sheets/audio_codecs.html?glad, accessed Jun. 12, 2005.

Universal Mobile Telecommunications System (UMTS); Push Architecture (3GPP TR 23.976 version 6.1.0 Release 6); Jun. 2004; 36 pages.

3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.

International Preliminary Report on Patentability in PCT/US2006/022985 dated Jan. 3, 2008; 6 pages.

FCC E911 Order, CC Docket No. 94-102, dated: Nov. 23, 1998.

* cited by examiner

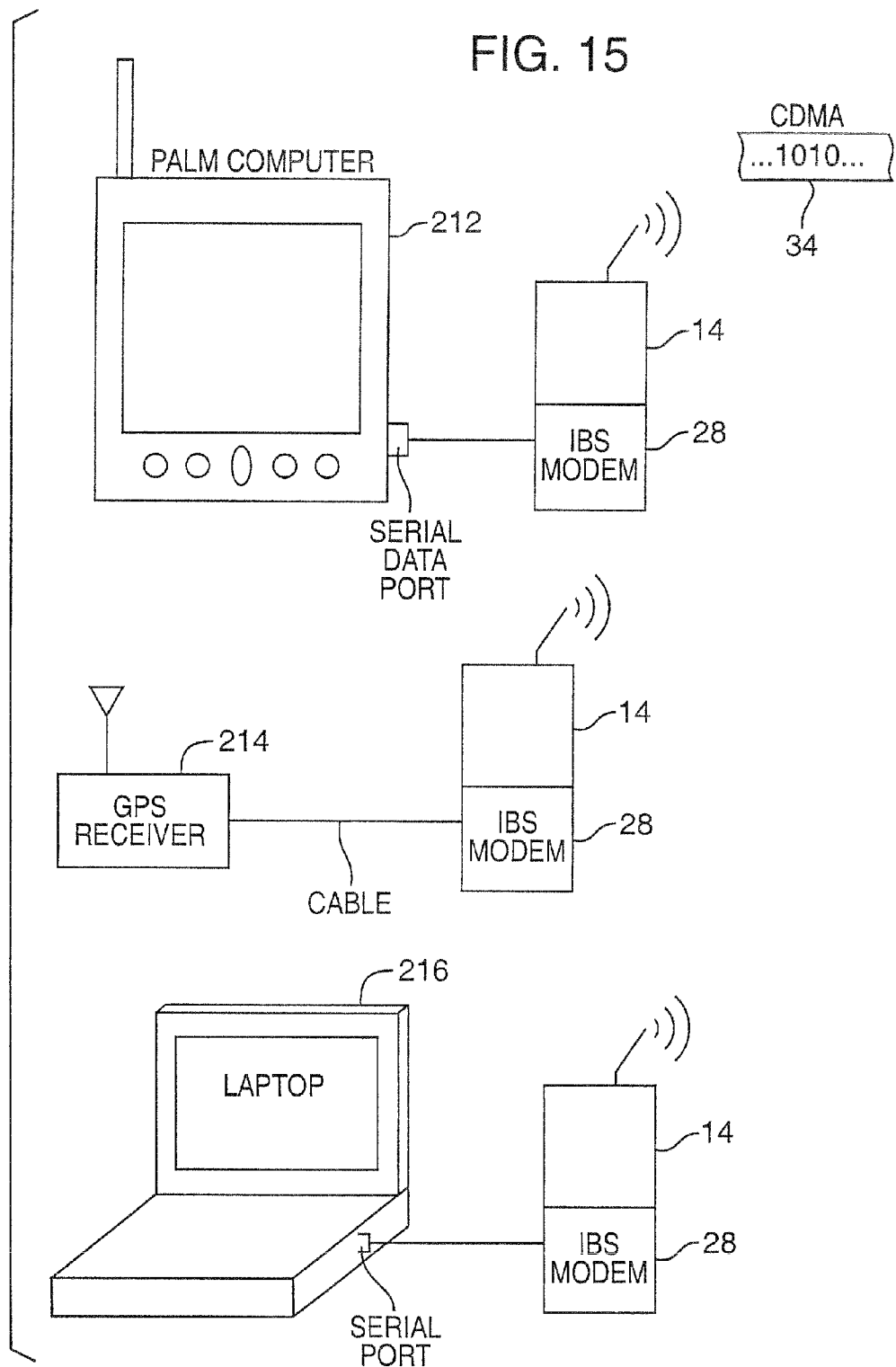

METHOD FOR IN-BAND SIGNALING OF DATA OVER DIGITAL WIRELESS TELECOMMUNICATIONS NETWORKS

RELATED APPLICATIONS

This application is a continuation of U.S. application Ser. No. 10/099,098 filed Mar. 15, 2002, now issued as U.S. Pat. No. 7,317,696, which is a divisional of U.S. application Ser. No. 09/531,367 filed Mar. 21, 2000, now issued as U.S. Pat. No. 6,690,681 which is a continuation-in-part of U.S. application Ser. No. 09/230,079, filed May 13, 1999, now issued as U.S. Pat. No. 6,144,336, which is the U.S. national phase application corresponding to International Application No. PCT/US98/10317, filed May 19, 1998 all of which claim priority to U.S. Provisional Application 60/047,034, filed May 19, 1997, U.S. Provisional Application 60/047,140 filed May 20, 1997, U.S. Provisional Application 60/048,369, filed Jun. 3, 1997, U.S. Provisional Application 60/048,385, filed Jun. 3, 1997, and U.S. Provisional Application 60/055,497, filed Aug. 12, 1997.

TECHNICAL FIELD

This invention is related to wireless telecommunications and more specifically to a system that transmits digital data over the audio channel of a digital wireless network "in-band."

BACKGROUND OF THE INVENTION

A cellular telephone allows a user to talk to another user without being tethered to a "land line." The cell phone includes circuitry that samples the audio signals from the user's voice. These voice signals are converted into a digital form using an A-D converter. The digitized voice signals are encoded by a voice coder (vocoder) and then modulated onto a carrier frequency that transmits the voice signals over a cell network. The voice signals are sent over the wireless cellular network either to another phone in the wireless cell network or to another phone in a land-line phone network.

Different coders/decoders (codecs), modulators, vocoders, Automatic Gain Controllers (AGC) Analog to Digital converters (A/D), noise reduction circuits, and Digital to Analog converters (D/A) are used in the cellular and landline phone networks. These telephone components can implement different coding schemes for encoding and decoding the voice signals.

These telecommunication components are designed to efficiently transmit voice signals over wireless and landline voice communication channels. For example, a digital vocoder uses predictive coding techniques to represent the voice signals. These predictive coders filter out noise (non-voice signals) while compressing and estimating the frequency components of the voice signals before being transmitted over the voice channel.

A problem arises when voice communication equipment, such as the vocoder, are used for transmitting digital data. The vocoders may interpret signals representing digital data as a non-voice signal. The vocoder might completely filter out or corrupt those digital data signals. Therefore, digital data can not be reliably transmitted over the same digital audio channel used for transmitting voice signals.

It is sometimes necessary for a user to transmit both audio signals and digital data to another location at the same time. For example, when a cellular telephone user calls "911" for emergency assistance, the user may need to send digital location data to a call center while at the same time verbally explaining the emergency conditions to a human operator. It would be desirable to transmit this digital data through a cell phone without having to use a separate analog wireless modem.

Accordingly a need exists for transmitting digital data over a voice channel of a digital wireless communications network.

SUMMARY OF THE INVENTION

An inband signaling modem communicates digital data over a voice channel in a digital wireless telecommunications network. An input receives digital data. An encoder converts the digital data into audio tones that synthesize frequency characteristics of human speech. The digital data is also encoded to prevent voice encoding circuitry in the telecommunications network from corrupting the synthesized audio tones representing the digital data. An output then outputs the synthesized audio tones to a voice channel of a digital wireless telecommunications network. In some embodiments, a hand-held, portable device includes an in-band signaling modem and includes a processor and the in-band signaling modem is implemented in software stored in a memory on the device for execution by the processor.

The foregoing and other features and advantages of the invention will become more readily apparent from the following detailed description of preferred embodiments of the invention, which proceeds with reference to the accompanying drawings.

BRIEF DESCRIPTION OF THE DRAWINGS

FIG. 15 are schematic diagram showing different data sources coupled to a cellular telephone through a IBS modem.

DETAILED DESCRIPTION OF PREFERRED EMBODIMENTS

Figure 1:
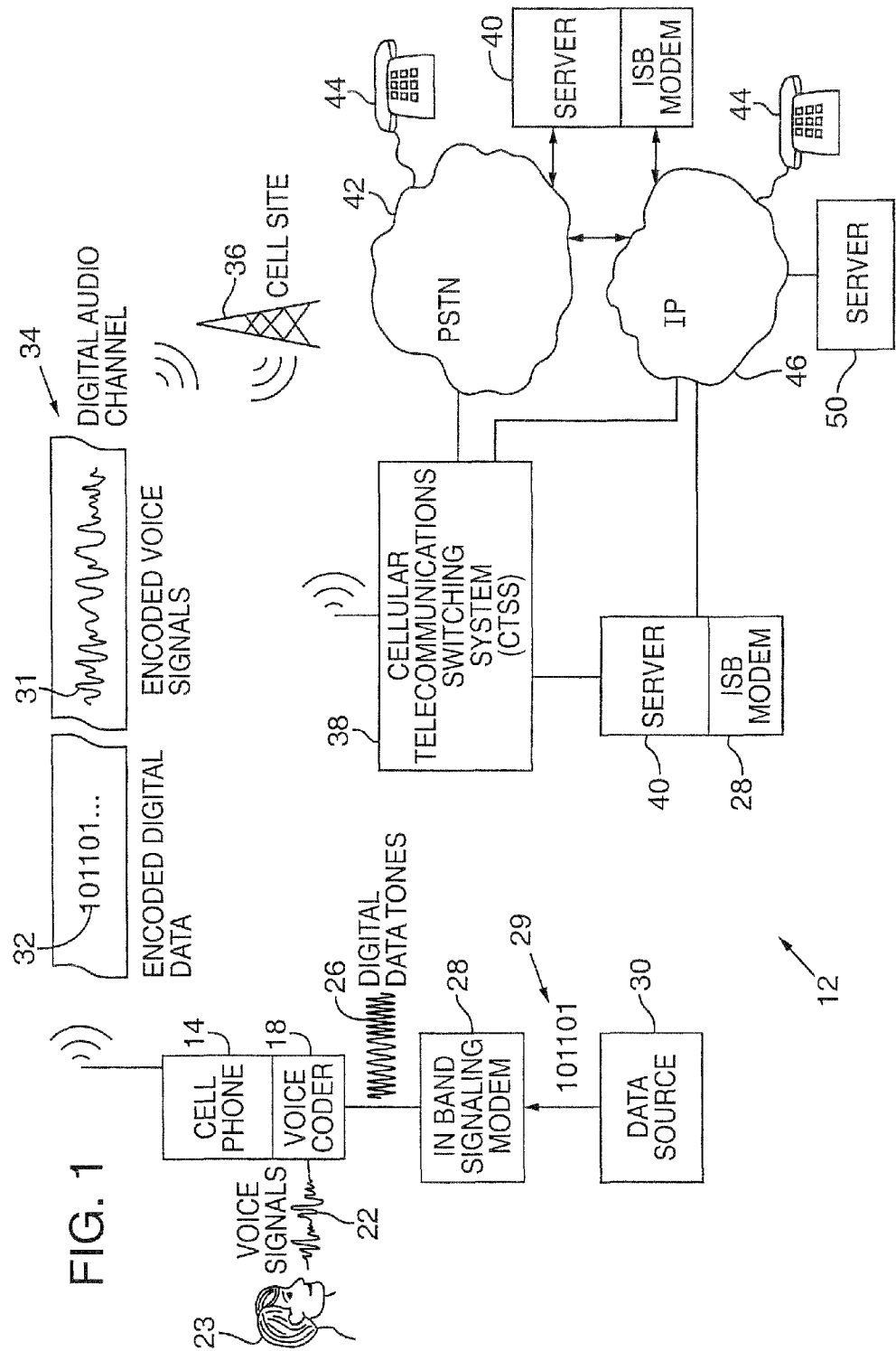
FIG. 1 is a diagram showing a wireless communications network that provides in-band signaling (IBS) according to the invention.

Referring to FIG. 1, a wireless communications network 12 includes a cell phone 14 that receives voice signals 22 from a user 23. A voice coder (vocoder) 18 in the cell phone 14 encodes the voice signals 22 into encoded digital voice signals 31 that are then transmitted over a wireless digital audio channel 34 (cell call). The cell phone 14 transmits the encoded voice signals 31 to a cellular communications site (cell site) 36 that relays the cell call to a Cellular Telecommunications Switching System (CTSS) 38.

The CTSS 38 either connects the cell call to another cell phone either in the wireless cellular network 12, to a landline phone on a PSTN network 42 as a circuit switched call or routes the cell call over a packet switched Internet Protocol (IP) network 46 as a Voice Over IP (VoIP) call. The cell call can also be routed from the PSTN network 42 back to the cellular network 12 or from the PSTN network 42 to the IP network 46, or visa versa. The cell call eventually reaches a telephone 44 that corresponds with a destination phone number originally entered at the cell phone 14.

The invention comprises an In-Band Signaling (IBS) modem 28 that enables cell phone 14 to transmit digital data 29 from a data source 30 over the digital audio channel 34 of the cellular network 12. The IBS modem 28 modulates the digital data 29 into synthesized digital data tones 26. The digital data tones 26 prevent the encoding components in the cellular network 12 and landline network 42, such as vocoder 18, from corrupting the digital data. The encoding and modulation scheme used in the IBS modem 28 allows digital data 29 to be transmitted through the same voice coder 18 used in the cell phone 14 for encoding voice signals 22.

The IBS modem 28 enables voice signals 22 and digital data 29 to be transmitted over the same digital audio channel using the same cell phone circuitry. This prevents a user from having to transmit digital data using a separate wireless modem and enables a cell phone user to talk and send data during the same digital wireless call.

The invention modulates the digital data 29 into synthesized voice tones. This prevents the cell phone vocoder 18 from filtering or corrupting the binary values associated with the digital data 29. The same cell phone transceiver and encoding circuitry is used for transmitting and receiving both voice signals and digital data. This enables the IBS modem 28 to be much smaller, less complex and more energy efficient than a standalone wireless modem. In some embodiments, the ISB modem 28 is implemented entirely in software using only the existing hardware components in the cell phone 14.

One or more servers 40 are located at any of various locations in the wireless network 12, PSTN network 42, or IP network 46. Each server 40 includes one or more IBS modems 28 that encode, detect and decode the digital data 29 transmitted and received over the digital audio channel 34. Decoded digital audio tones 26 are either processed at the server 40 or routed to another computer, such as computer 50.

Figure 2:
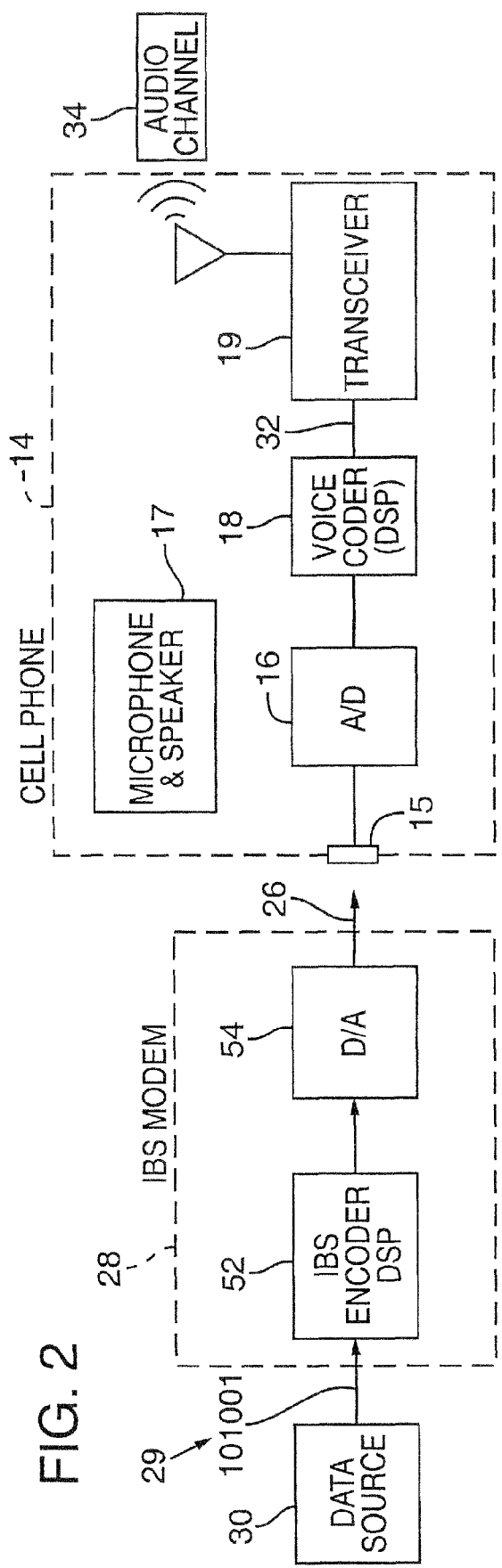
FIG. 2 a detailed diagram of a cellular telephone coupled to an IBS modem according to one embodiment of the invention.

Referring to FIG. 2, a first transmitting portion of the IBS modem 28 includes an ISB encoder 52 and a Digital to Analog converter (D/A) 54. The ISB encoder 52 is typically implemented using a Digital Signal Processor (DSP). The data source 30 represents any device that requires wireless transmission or reception of digital data. For example, the data source 30 can be a laptop computer, a palm computer or a Global Positioning System (GPS) (see FIG. 15).

The data source 30 outputs a digital bit stream 29 to the IBS encoder 52. The IBS encoder 52 converts the digital data 29 into IBS packets specially formatted for transmission over a digital wireless voice channel. The IBS encoder 52 then converts the bits from the IBS packets into digital data tones that are then fed into the D/A converter 54.

The IBS modem 28 outputs binary values that each represent an amplitude and phase component of an audio tone. The D/A converter 54 converts these digital values into analog audio tones 26 that are then output to an auxiliary audio port 15 on the cell phone 14. The analog audio tones 26 are then processed by the cell phone 14 in the same manner as the voice signals 22 (FIG. 1) received through a microphone 17. An Analog to Digital (A/D) converter 16 in the cell phone 14 encodes the synthesized analog audio tones 26 into digital values. The vocoder 18 encodes the digital representations of the synthesized tones 26 into encoded digital data 32 and outputs the encoded data to a transceiver 19 that transmits the encoded digital data 32 over the digital audio channel 34.

The preferred voltage of the synthesized audio tones 26 output from the D/A converter 26 is around 25 millivolts peak to peak. This voltage level was discovered to prevent the audio tones 26 from saturating the voice channel circuitry in cell phone 14.

Because the digital data 29 is fed through the existing auxiliary hands free audio port 15 in cell phone 14, the IBS modem 28 can be installed as an after market device that can connect any data source 30 to the cell phone 14. The data source 30 can transmit digital data 29 in any digital format. For example, the digital data 29 can be sent over an RS-232 interface, Universal Serial Bus (USB) interface, or any other serial or parallel interface.

Figure 3:
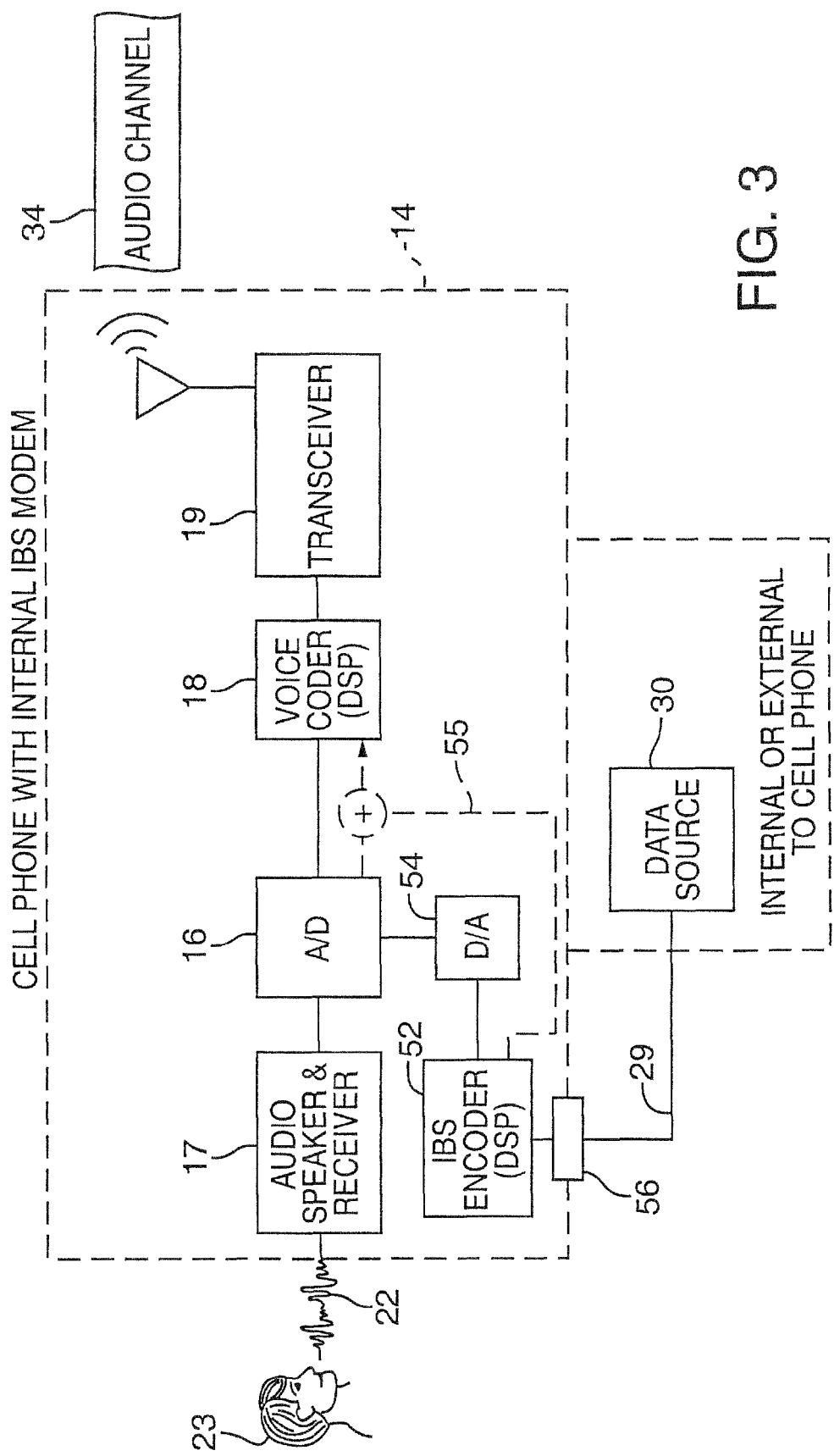
FIG. 3 is another embodiment of the IBS modem according to the invention.
Figure 14:
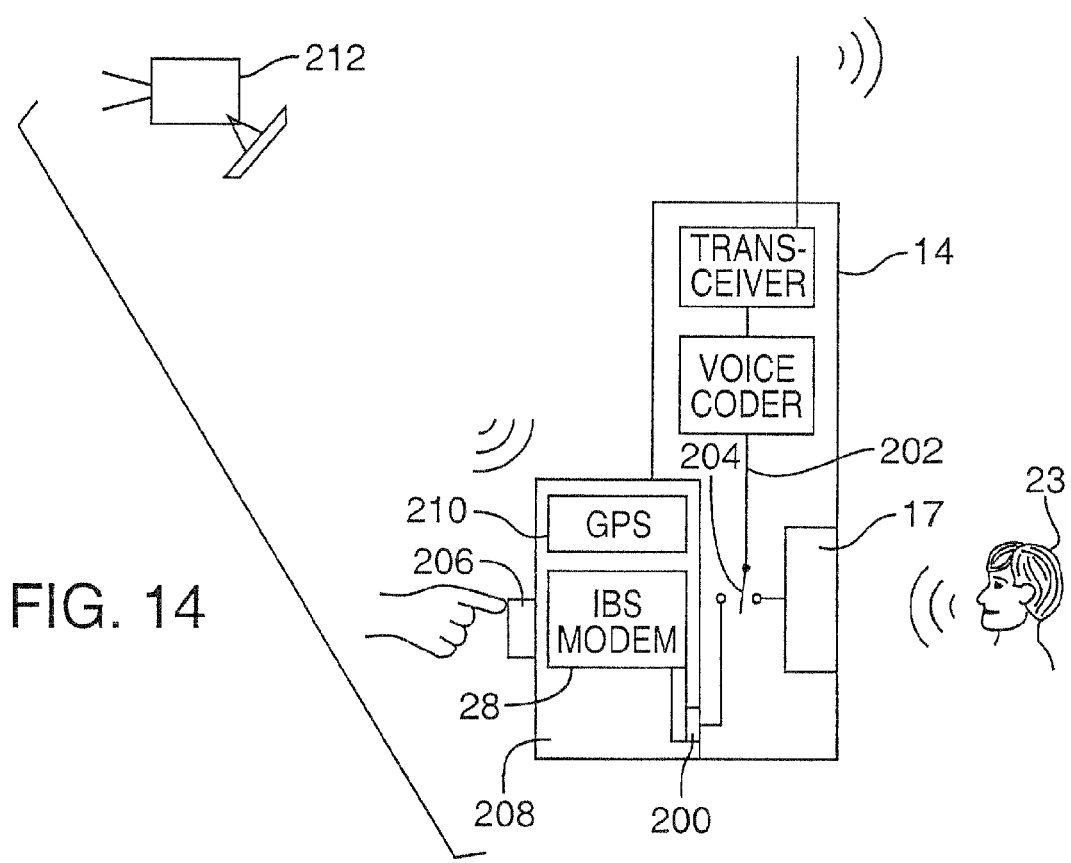
FIG. 14 is a schematic diagram of a cellular phone with the IBS modem located in a detachable battery pack.

FIG. 3 shows an alternative embodiment of the IBS modem 28. The IBS modem 28 in FIG. 3 is located inside the cell phone 14 and is implemented in software using the existing cell phone processor or using some combination of its own components and the existing cell phone components. In this embodiment, the cell phone 14 may include a data port 56 that receives the digital data 29 from the external data source 30. In an alternative embodiment, the digital data source 30 is internal to the cell phone 14. For example, the data source 30 may be a Global Positioning System (GPS) chip that includes a GPS receiver (not shown) for receiving global positioning data from GPS satellites (FIG. 14).

The IBS encoder 52 in FIG. 3 as mentioned above typically implemented in software using a DSP and may use the same DSP used for implementing the vocoder 16. The D/A converter 54 outputs the synthesized audio tones representing digital data 29 to the internal A/D converter 18 of the cell phone 14. The IBS encoder 52 in an alternative embodiment, not only synthesizes the digital data 29 into audio tones but also quantizes the digital frequency values in the same manner as the A/D converter 18. The IBS encoder 52 then outputs the quantized data 55 directly into the vocoder 16. In still another embodiment of the invention, the IBS encoder 52 and D/A converter 54 and implemented entirely in software in the same DSP that implements the vocoder 16.

The vocoder 18 uses a specific encoding scheme associated with the wireless communications network 12 (FIG. 1). For example, the vocoder 18 could be a VCELP encoder that converts voice signals into digital CDMA signals. The A/D converter 18, D/A converter 54 and transceiver 19 are existing cell phone components known to those skilled in the art.

It is important to note that the ISB encoder 52 enables the digital data 29 to be transmitted using the same cell phone circuitry that transmits voice signals. The IBS encoder 52 prevents any signal approximation, quantization, encoding, modulation, etc. performed by the, A/D converter 18, vocoder 16, or transceiver 19 from corrupting or filtering any bits from the digital data 29.

Figure 4:
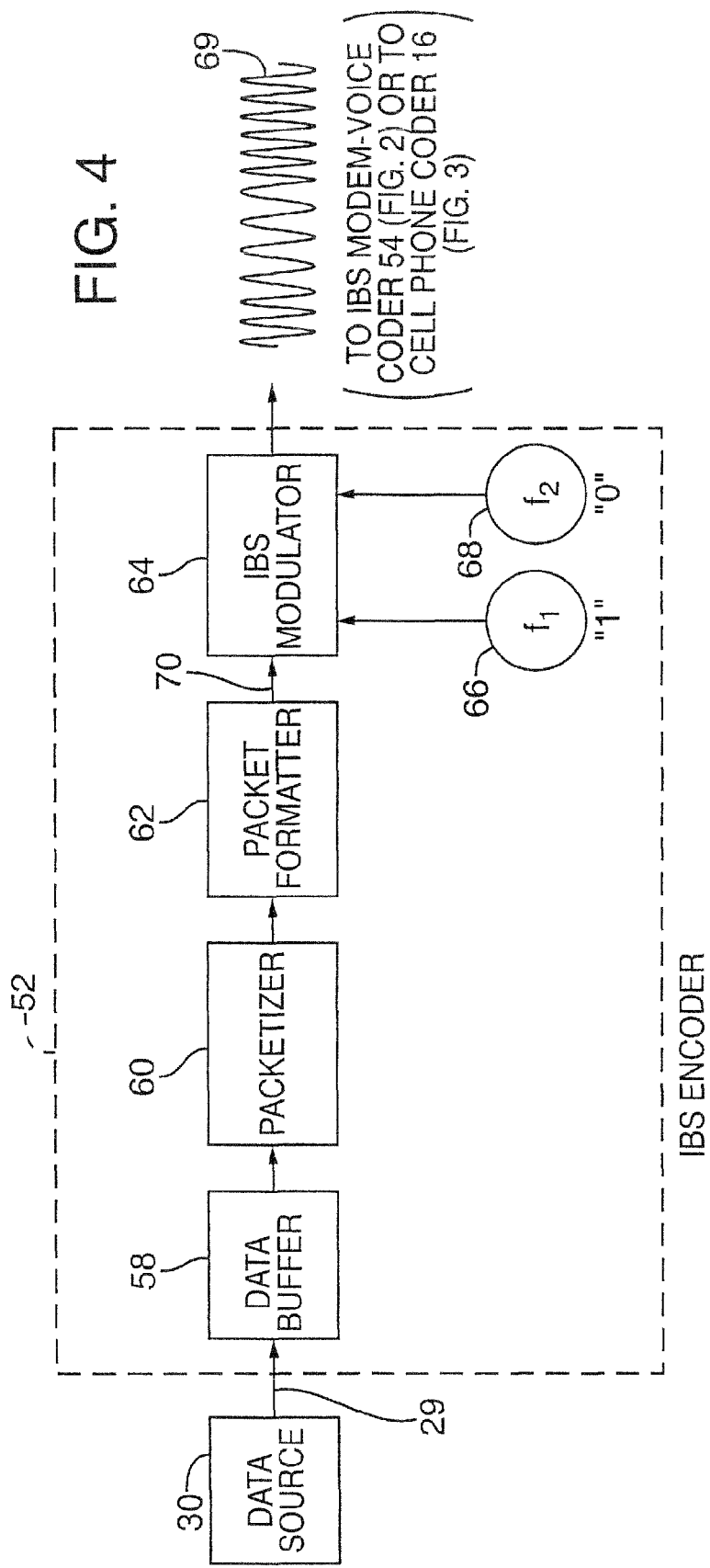
FIG. 4 is a detailed diagram of an IBS modem encoder.

FIG. 4 is a detailed diagram of the IBS encoder 52 shown in FIG. 2 and FIG. 3. A data buffer 58 stores the binary bit stream 29 from the data source 30. A packetizer 60 segments the bits in buffer 58 into bytes that comprise a IBS packet payload. A packet formatter 62 adds a packet preamble and postamble that helps prevent corruption of the IBS packet payload. An IBS modulator 64 then modulates the bits in the IBS packet with two or more different frequencies 66 and 68 to generate digital data tones 69.

Preventing Corruption of Digital Data in Voice Channels

Cell phone voice coders increase bandwidth in voice channels by using predictive coding techniques that attempt to describe voice signals without having to send all the frequency information associated with human speech. If any unnatural frequencies or tones are generated in the voice channel (i.e., frequencies representing digital data), those frequencies might be thrown out by the voice coder 18 (FIG. 2). For example, if the amplitude of the digital data tones are greater than that of normal voice signals or the same digital data tone is generated for too long a time period, the voice coder 18 will filter out that high amplitude or extended frequency signal. Depending on how the digital data tones are encoded, the digital bits represented by those unnatural audio tones may be partially or entirely removed from the voice channel.

The IBS encoder 52 encodes the digital data 29 to synthesize voice signals in a manner where voice coders will not filter or corrupt the tones representing digital data. The IBS encoder 52 does his by controlling the amplitudes, time periods and patterns of the synthesized frequencies used to represent the binary bit values.

Figure 5:
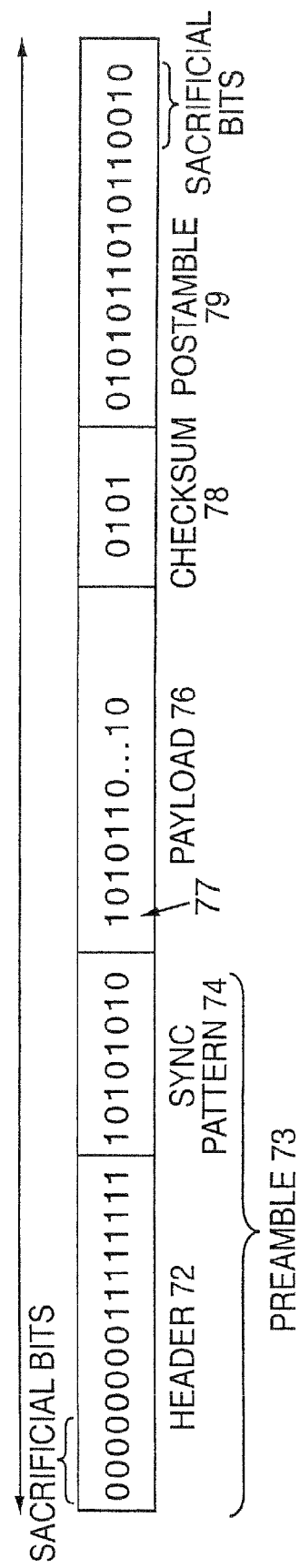
FIG. 5 is a schematic diagram of a IBS packet.

Referring to FIG. 5, the packet formatter 62 (FIG. 4) adds a packet preamble 73 that includes a header 72 and a sync pattern 74 to the front of a IBS packet 70. A checksum 78 and a packet postamble 79 are attached to the backend of the IBS packet 70.

Before the digital data is transmitted, a zero payload IBS packet 70 is sent to the destination. The destination sends back an acknowledge to the IBS modem 28 in the form of a zero packet payload IBS packet. This acknowledge packet informs the IBS modem 28 in the cell phone 14 to begin transmitting IBS packets 70.

Figure 6:
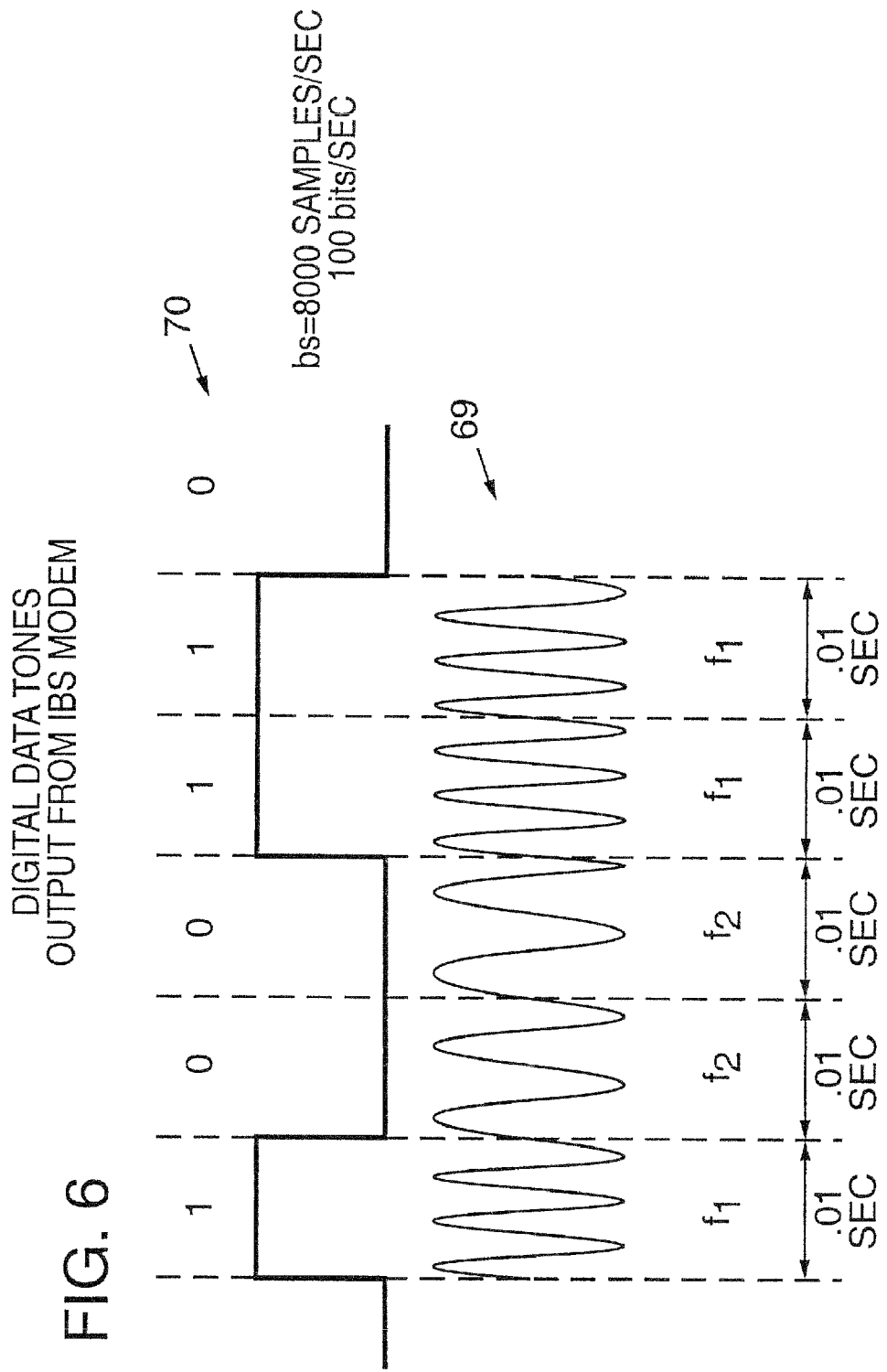
FIG. 6 is a schematic diagram of digital data tones output from a IBS modulator.

FIG. 6 shows the synthesized digital data tones 69 output from the IBS modulator 64 (FIG. 4). The IBS modulator 64 (FIG. 4) converts the digital bits in the IBS packet 70 into one of two different tones. A first tone is generated at an f1 frequency and represents a binary "1" value and a second tone is generated at a f2 frequency and represents a binary "0" value. In one embodiment the f1 frequency is 600 Hertz and the f2 frequency is 500 Hertz (Hz).

It has been determined that the most effective frequency range for generating the tones that represent the binary bit values are somewhere between 400 Hertz and 1000 Hertz. The IBS modulator 64 includes Sine and Cosine tables that are used to generate the digital values that represent the different amplitude and phase values for the f1 and f2 frequencies.

In one embodiment of the invention, the digital data is output on the audio channel 34 at a baud rate of 100 bits/second. This baud rate has been found to be effective in preventing corruption of the digital audio data by a wide variety of different cellular telephone voice coders. The sine waves for each f1 and f2 tone begin and end at a zero amplitude point and continue for a duration of 10 milliseconds. Eighty samples are generated for each digital data tone.

Figure 7:
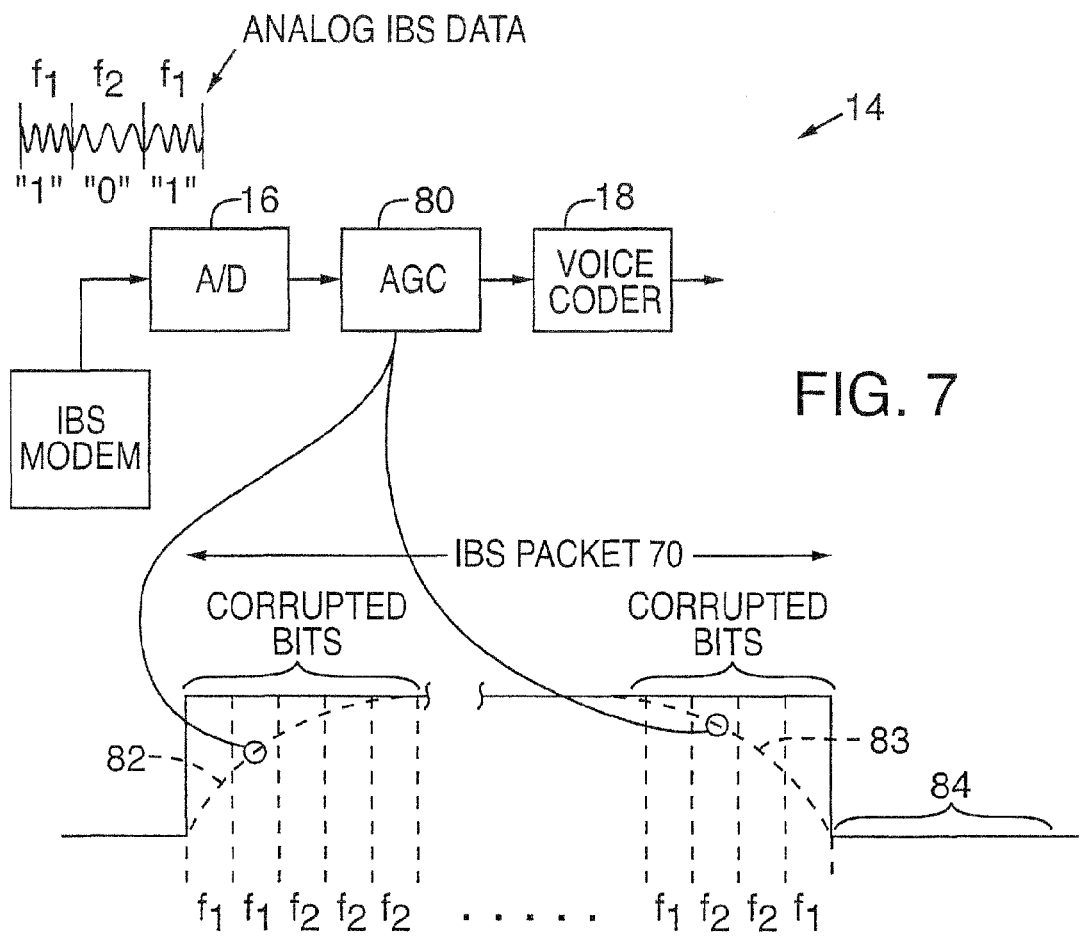
FIG. 7 is a diagram showing how digital data is corrupted by an Automatic Gain Controller.

Referring to FIG. 7, an Automatic Gain Controller (AGC) 80 is one encoding function used in the cell phone 14. The AGC 80 may be software that is located in the same DSP that implements the voice coder 16. The AGC 80 scales instantaneous energy changes in voice signals. There are situations when no voice signals have been fed into the AGC 80 for a period of time followed by a series of audio tones 82. that comprise the beginning of a IBS packet 70. The AGC 80 scales the first group of tones 82 at the beginning of the IBS packet 70. The AGC 80 also looks ahead at the zero signal levels 84 after the end of the IBS packet 70, and will scale the tones 83 at the end of the IBS packet 70 as part of its prediction scaling scheme. This scaling prevents the over amplification of signal or noise when instantaneous energy changes occur in the voice channel.

As previously shown in FIG. 6, the "1" and "0" bits of the IBS packet 70 are represented by tones f1 and f2, respectively. If these tones are scaled by the AGC 80, the digital bits represented by those frequencies might be dropped during encoding. For example, the vocoder 16 may see the scaled tones as noise and filter them from the audio channel. To prevent the unintentional filtering of tones that represent digital data, the IBS packet 70 in FIG. 5 includes preamble bits 73 and postamble bits 79. The preamble bits 73 and 79 do not contain any of the digital data bits 29 from the data source include a certain number of sacrificial bit that are not needed for detecting or encoding the IBS packet 70. Thus, the tones that are generated for these sacrificial bits in the preamble and postamble can be scaled or filtered by the AGC 80 without effecting any of the digital data contained in the IBS packet payload 76.

The bit pattern in the header 72 and sync pattern 74 are specifically formatted to further prevent corruption of the packet payload 76. A random sequence and/or an alternating "1"-"0" sequence of bits is used in either the header 72 and/or sync pattern 74. These alternating or random bit patterns prevent adaptive filters in the cell phone vocoder 18 (FIG. 2) from filtering tones representing the remaining bits in the IBS packet 70.

Figure 8:
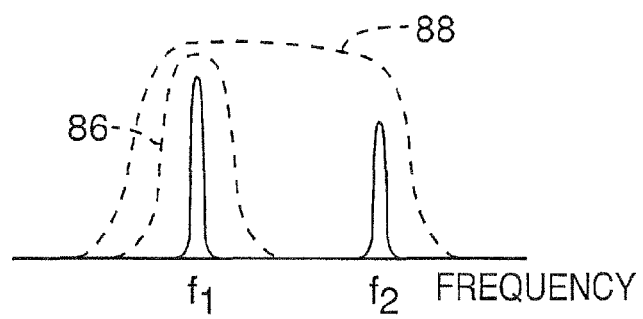
FIG. 8 is a diagram showing how a digital wireless network can filter out digital data tones.

Referring to FIG. 8, adaptive filters adapt around the frequencies that are currently being transmitted over the wireless network. For example, If a long period of the same f1 tone is currently being transmitted, an adaptive filter used in the cell phone may adapt around that f1 frequency spectrum as shown by filter 86.

Another short tone at another frequency f2 may immediately follow the long period of f1 tones. If the filter 86 is too slow to adapt, the first few f2 tones may be filtered from the voice channel. If the filtered f2 tone represent bits in the IBS bit stream, those bits are lost.

To prevent adaptive filters in the cell phone from dropping bits, some portion of the preamble 73 includes a random or alternating "1"-"0" bit pattern. This preconditions the adaptive filter as shown by filter 88. The preamble 73 tries to include a portion of the same bit sequence that is likely or does occur in the packet payload 76. For example, the IBS encoder 52 can look ahead at the bit pattern in the payload 76. The encoder 52 can then place a subset of bits in a portion of the preamble to represent the sequence of bits in the packet payload.

This preconditions the adaptive filter for the same f1 and f2 frequencies, in the same duration and in a similar sequence that is likely to follow in the IBS packet payload 76. Thus, the adaptive filter adapts is less likely to filter out the tones that actually represent the digital data that is being transmitted.

Figure 9:
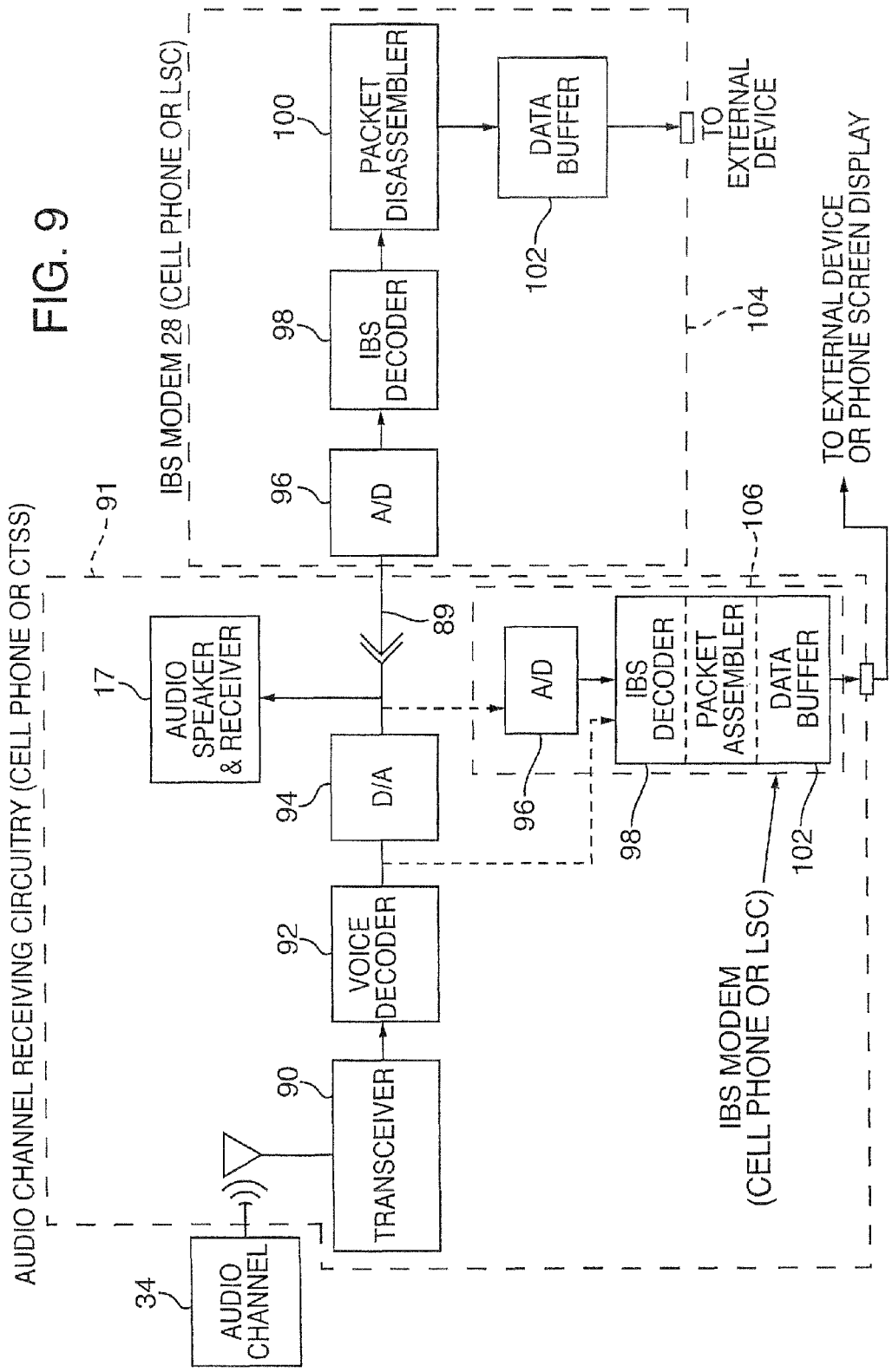
FIG. 9 is a detailed diagram of receiving circuitry coupled to an IBS modem decoder.

FIG. 9 is a block diagram of receive circuitry 91 that receives the voice and data signals in the audio channel 34. The IBS modem 28 also includes an IBS decoder 98 the detects and decodes the digital data tones transmitted in the audio channel 34. The receive circuitry 91 is located at the CTSS 38 (FIG. 1) that receives wireless transmissions from the cell sites 36 (FIG. 1). The same receive circuitry 91 is also be located in the cell phone 14.

As described above in FIGS. 2 and 3, the decoder part of the IBS modem 28 can be external to the cell phone 14 or can be inside the cell phone 14. Dashed line 104 shows an IBS modem 28 external to a cell phone and dashed line 106 shows an internal IBS modem 28 internal to a cell phone. IBS modems 14 can also be located at any telephone location in the PSTN network 42 or IP network 46 (FIG. 1). The receiving circuitry 91 may be different when the IBS modem 28 is coupled to a landline. However, the IBS modem 28 operates under the same principle by transmitting and receiving synthesized tones over the voice channel of the phone line.

The signals in audio channel 34 are received by a transceiver 90. A vocoder 92 decodes the received signals. For example, the vocoder 92 may decode signals transmitted in TDMA, CDMA, AMPS, etc. A D/A converter 94 then converts the digital voice signals into analog signals. The analog voice signals are then output from an audio speaker 17.

If the IBS modem 28 is external to the receiving circuitry 91, then a A/D converter 96 converts the analog signals back into digital signals. The IBS decoder 98 demodulates any tones representing digital data back into a digital IBS packets. A packet disassembler 100 disassembles the packet payload from the IBS packets 70 and stores the original digital data pattern in a data buffer 102.

Figure 10:
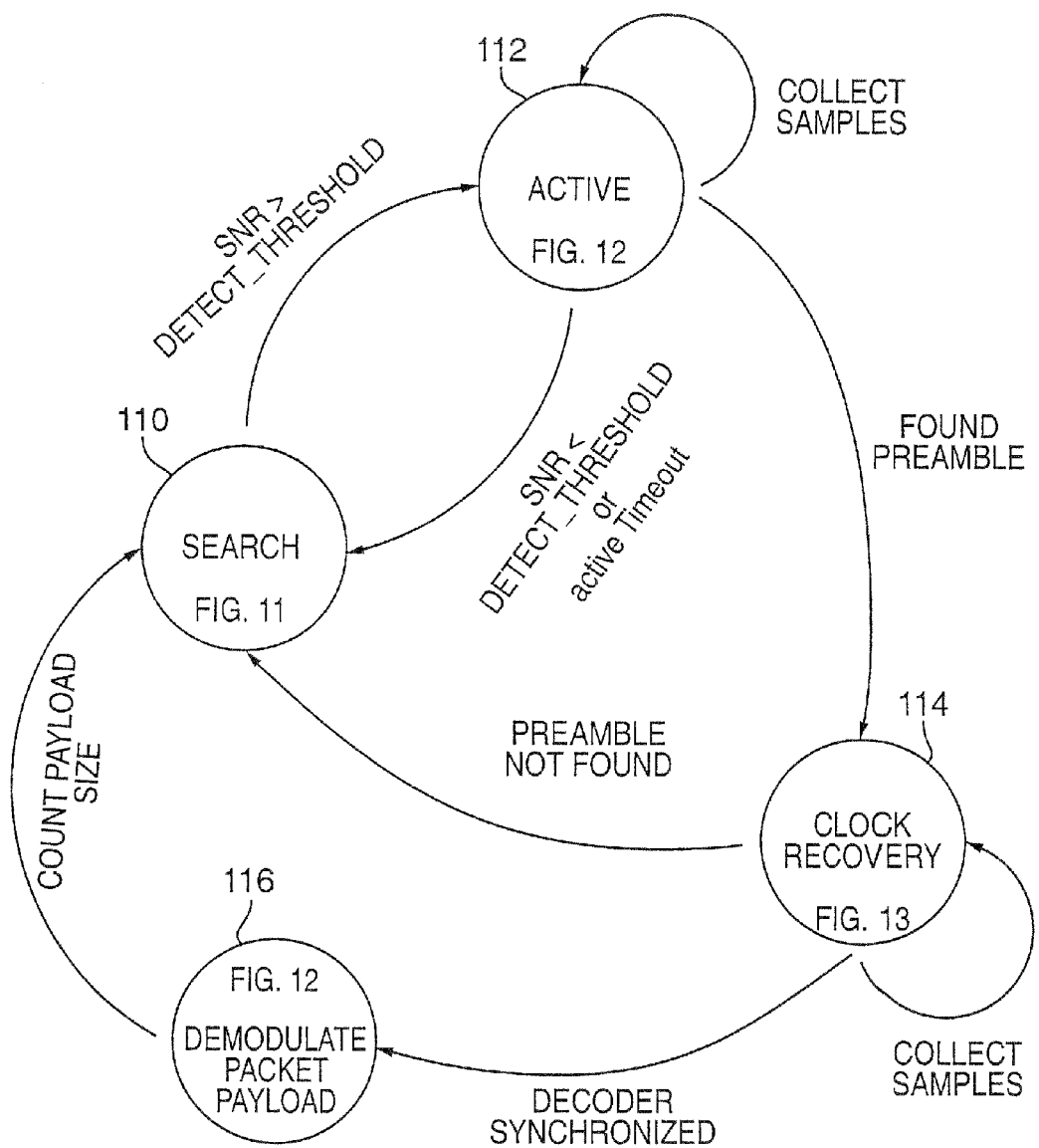
FIG. 10 is a state diagram for the IBS decoder shown in FIG. 9.

FIG. 10 is a state diagram explaining how the IBS decoder 98 in FIG. 9 operates. The IBS decoder 98 repeatedly samples and decodes the audio signals received from the audio channel 34. State 110 searches for tones in the audio signal that represent digital data. If the Signal to Noise Ratio (SNR), for tones within the frequency range of the digital data tones, are greater than a preselected value, the IBS decoder 98 goes into an active state 112. The active state 112 collects tone samples. If at any time during the active state 112, the SNR falls below an active threshold value, or a timeout is reached before enough tone samples are collected, the IBS decoder 98 returns to the search state 110 and begins again to search for digital data tones.

After a number of samples are collected, the IBS decoder 98 looks for bits that identify the preamble 73 in the IBS packet 70 (FIG. 5). If the preamble 73 is detected, the IBS decoder 98 moves to clock recovery state 114. The clock recovery state 114 synchronizes with the synchronization pattern 74 in the IBS packet 70 (FIG. 5). The IBS decoder 98 then demodulates the packet payload 76 in state 116. If the preamble 73 is not found, IBS decoder 98 goes back to the search state 110 and starts searching again for the beginning of an IBS packet 70.

The IBS decoder 98 demodulates all of the packet payload 76 and then performs a checksum 78 as a final verification that a valid IBS packet 70 has been successfully demodulated. Control then returns back to the search state 110 and begins searching for the next IBS packet 70.

Figure 11:
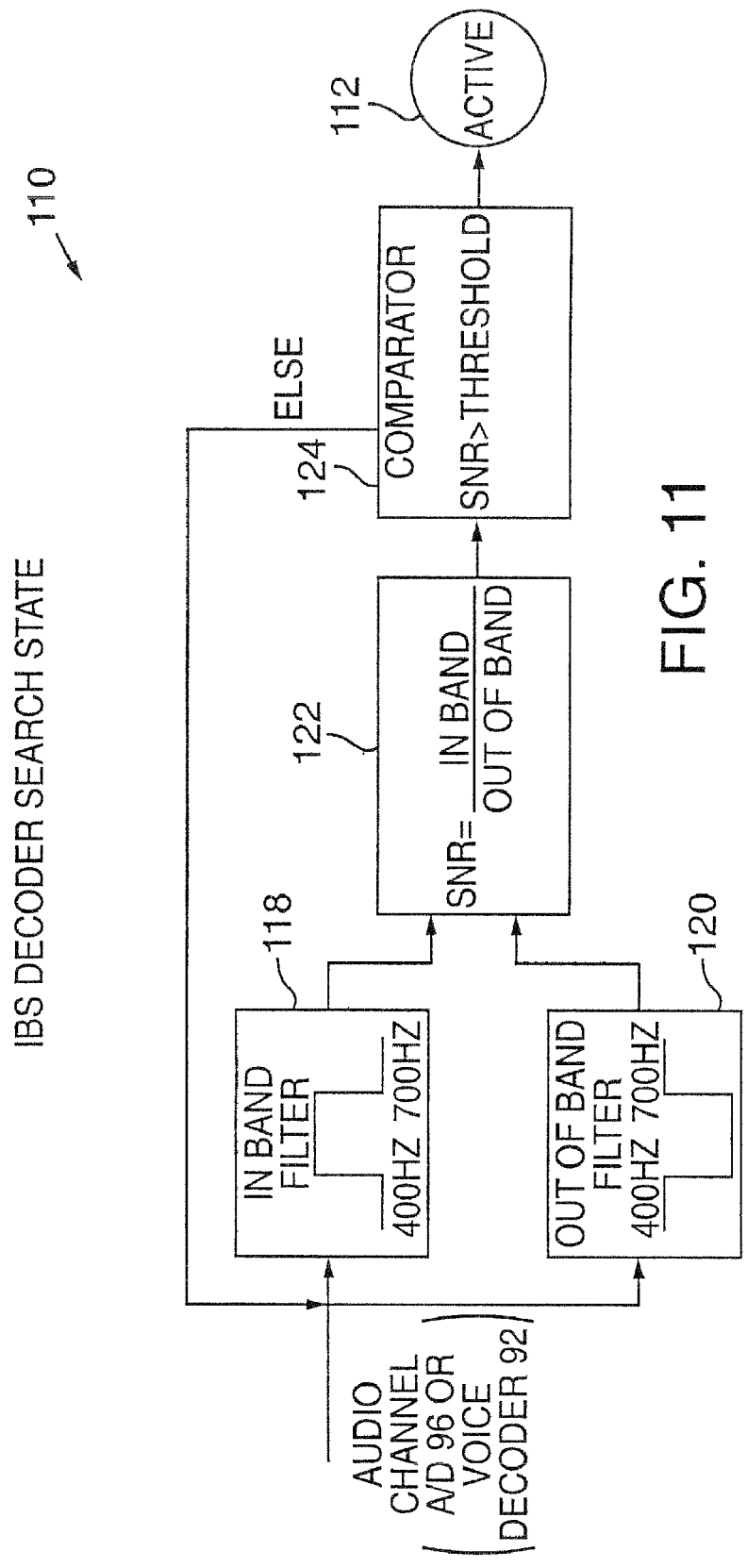
FIG. 11 is a block diagram showing a search state in the IBS decoder.

FIG. 11 is a detailed diagram for the search state 110 of the IBS decoder 98. The search state 110 uses in band and out of band filtering. "In band" is used in the following discussion to refer to tones within the frequency range of the two tones that represent the digital data binary "1" value (500 Hz) and the digital data binary "0" value (600 Hz).

A first band pass filter 118 (in band) measures energy for signals in the audio channel within the frequency range of about 400 Hz to around 700 Hz. A second band pass filter 120 (out of band) measures the energy in the audio channel for signals outside of the 400 Hz-700 Hz range. A Signal to Noise Ratio (SNR) is calculated in block 122 between the in band energy and the out of band energy. If tones representing the digital data exist in the audio channel, the energy measured by the in band filter 118 will be much greater then the energy measured by the out of band filter 120.

If the SNR is below a selected threshold in comparator box 124, signals in the audio channel are determined to be actual voice signals or noise. If the SNR is above the threshold, the IBS decoder 98 determines the tones represent in band digital data. When digital data is detected, the IBS decoder 98 moves into the active state 112 to begin searching for the beginning of an IBS packet 70.

Figure 12:
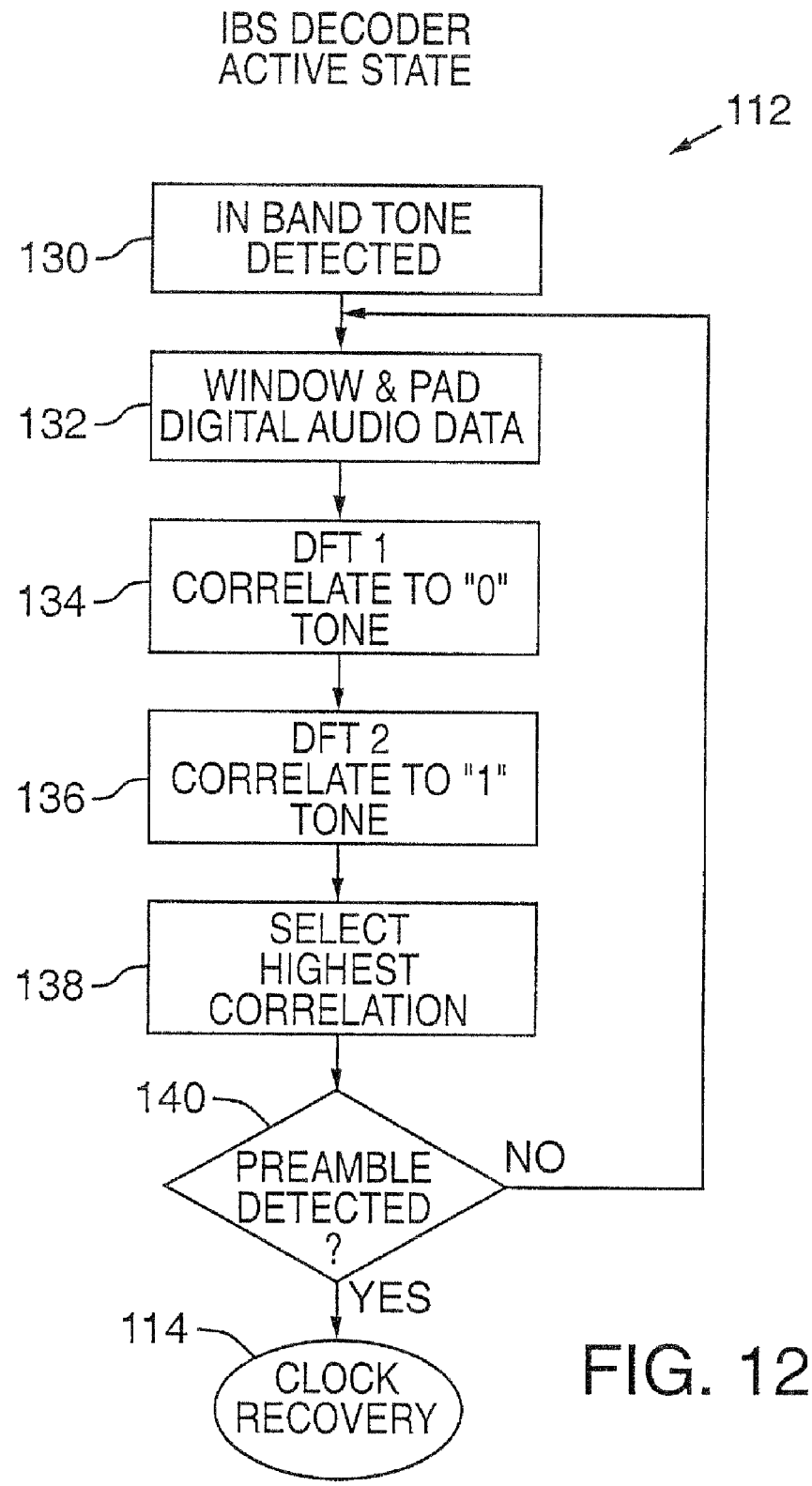
FIG. 12 is a block diagram showing an active state in the IBS decoder.

FIG. 12 shows the active state 112 for the IBS decoder 98. Block 130 is notified by the search state 110 when an in band tone is detected in the audio channel. Samples of the audio tones are windowed in block 132 with a number of samples associated with a single binary bit. In one embodiment, 80 samples of the digital data tone are taken, padded with zeros, and then correlated with Discrete Fourier Transforms (DFTs).

A first DFT has coefficients representing a 500 Hz tone and is applied to the windowed data in block 134. The first DFT generates a high correlation value if the samples contain a 500 Hz tone ("0" binary bit value). A second DFT represents a 600 Hz tone and is applied to the windowed samples in block 136. The second DFT generates a high correlation value if the windowed samples contain a 600 Hz tone ("1" binary bit value). Block 138 selects either a binary "0" or binary "1" bit value for the windowed data depending on which of the 500 Hz DCT or 600 Hz DCT yields the largest correlation value.

The IBS decoder 98 in decision block 140 continues to demodulate the tones until the preamble of the IBS packet 70 has been detected. The IBS decoder 98 then moves to clock recovery state 114 (FIG. 13) to synchronize with the sync pattern 74 in the IBS packet 70 (FIG. 5). If more bits need to be demodulated before the preamble 73 can be verified, decision block 140 returns to block 132 and the next 80 samples of the digital data tones are windowed and demodulated.

Figure 13:
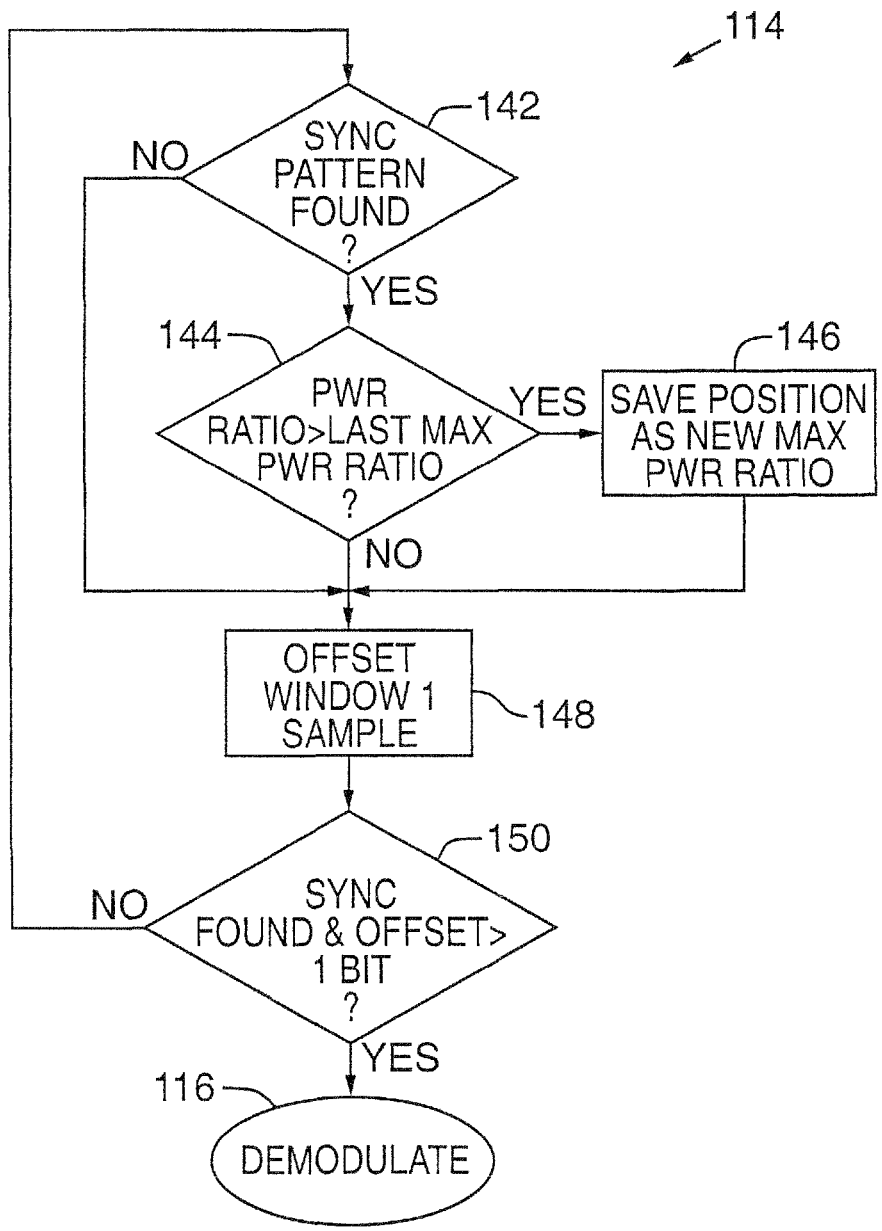
FIG. 13 is a block diagram showing a clock recovery state in the IBS decoder.

FIG. 13 describes the clock recovery state 114 for the IBS decoder 98. After the preamble 73 in the IBS packet 70 is detected in the active state 112, the clock recovery state 114 demodulates the next string of bits associated with the sync pattern 74 (FIG. 5). The clock recovery state 114 aligns the tone samples with the center of the correlation filters described in the active state 112. This improves decoder accuracy when demodulating the IBS packet payload 76.

Decision block 142 looks for the sync pattern 74 in the IBS packet 70. If after demodulating the next tone, the sync pattern 74 is not found, decision block 142 offsets the window used for sampling the sync pattern 74 by one sample in block 148. Decision block 150 then rechecks for the sync pattern 74. If the sync pattern 74 is found, decision block 144 determines the power ratio for the detected sync pattern. This power ratio represents a confidence factor of how well the demodulator is synchronized with the sync pattern. The power ratio is compared with the power ratios derived for different window shifted sampling positions. If the power ratio is greater then a previous sampling position, then that power ratio is saved as the new maximum power ratio in block 146.

If the power ratio for the sync pattern 74 is less then the previously measured power ratio, the decoder in block 148 offsets the sampling window by one sample position. The power ratio is then determined for the shifted window and then compared to the current maximum power ratio in decision block 144. The window is shifted until the maximum power ratio is found for the sync pattern 74. The window offset value at the maximum power ratio is used to align the demodulator correlation filters with the center sample of the first bit 77 (FIG. 5) in the IBS packet payload 76.

The IBS decoder 89 then jumps to demodulate state 116 (FIG. 10) where the identified window offset is used to demodulate the remaining 500 and 600 Hz tones that represent the packet payload bits 76 and check sum bits 78. The demodulation state 116 correlates the f1 and f2 tones with DFTs in the same manner as in the active state (FIG. 12). The check sum bits 78 are then used as a final check to verify that a valid IBS packet has been received and accurately decoded.

FIG. 14 is a diagram of the IBS modem 28 located in a battery pack connected to the cellular telephone 14. A hands free audio channel pin 200 couples the IBS modem 28 to the voice channel 202 in the cell phone 14. A switch 204 couples either voice signals from the microphone 17 or digital data tones from the IBS modem 28 to the voice channel 202.

The switch 204 is controlled either through a menu on a screen (not shown) in the cell phone 14 or by a button 206 that extends out of the back end of the battery pack 208. The switch 204 can also be controlled by one of the keys on the keyboard of the cell phone 14.

The button 206 can also be used to initiate other functions provided through the IBS modem 28. For example, a Global Positioning System (GPS) includes a GPS receiver 210 located in the battery pack 208. The GPS receiver 210 receives GPS data from a GPS satellite 212. A cell phone operator simply pushes button 206 during an emergency situation. Pressing the button 206 automatically enables the GPS receiver 210 to collect GPS data from GPS satellite 212. At the same time, the switch 204 connects IBS modem 28 on the voice channel 202 of the cell phone 14. The IBS modem 28 is then activated. As soon as the GPS data is collected in the IBS modem 28, the data is formatted, encoded and output by IBS modem 28 to the voice channel 202 of the cell phone 14.

The user 23 can push the button 206 anytime after manually calling up a phone number. After the audio channel is established with another endpoint, the user 23 pushes button 206. Switch 204 is connected to the IBS modem 28 and the IBS modem 28 is activated. The GPS data (or other digital source) is then sent as digital data tones through the IBS modem 28 to an endpoint over the established audio channel. After the data has been successfully transmitted, the user presses button 206 again reconnect switch 204 to the audio receiver 17.

FIG. 15 shows the different types of data sources that can be connected to the IBS modem 28. Any one of a palm computer 212, GPS receiver 214 or a laptop computer 216, etc. can are coupled to the IBS modem 28. The IBS modem 28 converts the bits output from the device into digital data tones that are then output over the audio channel 34 in the wireless network. Because data can transmitted to another endpoint through the cell phone 14, none of the devices 212, 214 or 216 need a separate wireless modem.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A portable device comprising:
a digital processor arranged to implement an in-band signaling modem for receiving digital data over a digital voice channel of a wireless communications network, the digital processor adapted to execute software, and the software stored in a computer-readable storage medium disposed in the portable device;
and wherein the software is arranged to implement
an input that receives voice signals over the digital voice channel of the wireless communications network;
a filter that detects synthesized tones representing the digital data that is interleaved with the voice signals transmitted over the digital voice channel, the synthesized tones synthesizing frequency characteristics of human speech and preventing voice encoding circuitry in the wireless telecommunications network from corrupting the digital data represented by the synthesized audio tones; and
a demodulator that converts the detected synthesized tones back into the represented digital data;
wherein the filter includes:
a first in-band filter for detecting signals outside of a predetermined synthesized tone frequency band;
a second out-of-band filter for detecting signals inside the synthesized tone frequency band; and
a comparator that compares the signals detected outside the synthesized tone frequency band with the signals detected inside the synthesized tone frequency band and identifies signals as synthesized tones when the compared value is greater than a selected value.

2. A portable device according to claim 1 wherein the digital processor comprises a signal-processing apparatus in the portable device.

3. A portable device according to claim 1 wherein the software is executable in a digital processor in the portable device and the portable device includes a transceiver for voice channel communications over a wireless communications network.

* * * * *

UNITED STATES PATENT AND TRADEMARK OFFICE
CERTIFICATE OF CORRECTION

PATENT NO. : 7,747,281 B2  Page 1 of 1
APPLICATION NO. : 11/970433
DATED : June 29, 2010
INVENTOR(S) : Dan A. Preston et al.

It is certified that error appears in the above-identified patent and that said Letters Patent is hereby corrected as shown below:

Page 1, column 1 (Related U.S. Application Data), line 1:  Delete item "(60)" and insert item -- (63) --, therefor;

Page 5, column 1 (Other Publications), line 30:  Delete "Voioeband" and insert -- Voiceband --, therefor; and Page 5, column 2 (Other Publications), line 26:  Delete "serier)." and insert -- series). --, therefor.

Signed and Sealed this

Fourteenth Day of December, 2010

David J. Kappos
*Director of the United States Patent and Trademark Office*